US012711973B2

(12) United States Patent
Skordilis et al.

(10) Patent No.: US 12,711,973 B2
(45) Date of Patent: Aug. 18, 2026

(54) SYSTEMS AND METHODS FOR MULTI-BAND AUDIO CODING

(71) Applicant: QUALCOMM Incorporated, San Diego, CA (US)

(72) Inventors: Zisis Iason Skordilis, San Diego, CA (US); Vivek Rajendran, San Diego, CA (US); Duminda Dewasurendra, San Diego, CA (US); Guillaume Konrad Sautiere, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 18/689,052

(22) PCT Filed: Oct. 10, 2022

(86) PCT No.: PCT/US2022/077868
§ 371 (c)(1),
(2) Date: Mar. 4, 2024

(87) PCT Pub. No.: WO2023/064738
PCT Pub. Date: Apr. 20, 2023

(65) Prior Publication Data

US 2024/0371384 A1 Nov. 7, 2024

(30) Foreign Application Priority Data

Oct. 14, 2021 (GR) .............................. 20210100699

(51) Int. Cl.
*G10L 19/08* (2013.01)
*G10L 19/087* (2013.01)
*G10L 19/26* (2013.01)

(52) U.S. Cl.
CPC ............ *G10L 19/08* (2013.01); *G10L 19/087* (2013.01); *G10L 19/26* (2013.01)

(58) Field of Classification Search
CPC ....... G10L 19/08; G10L 19/087; G10L 25/30; G10L 21/038; G10L 21/0388
See application file for complete search history.

(56) References Cited

U.S. PATENT DOCUMENTS 5,455,888 A * 10/1995 Iyengar ............... G10L 19/0204 704/223
5,682,407 A * 10/1997 Funaki .................. G10L 19/083 375/240

(Continued)

FOREIGN PATENT DOCUMENTS

EP 1887566 A1 2/2008
TW 201205557 A 2/2012

OTHER PUBLICATIONS

Valin, Jean-Marc, and Jan Skoglund. "A real-time wideband neural vocoder at 1.6 kb/s using LPCNet." arXiv preprint arXiv: 1903. 12087 (2019).*

(Continued)

*Primary Examiner* — Shaun Roberts
(74) *Attorney, Agent, or Firm* — QUALCOMM Incorporated; Espartaco Diaz Hidalgo

(57) ABSTRACT

Systems and techniques are described for audio coding. An audio system receives feature(s) corresponding an audio signal, for example from an encoder and/or a speech synthesis engine. The audio system generates an excitation signal, such as a harmonic signal and/or a noise signal, based on the feature(s). The audio system uses a filterbank to generate band-specific signals from the excitation signal. The band-specific signals correspond to frequency bands. The audio system inputs the feature(s) into a machine learning (ML) filter estimator to generate parameter(s) associated with linear filter(s). The audio system inputs the feature(s) into a voicing estimator to generate gain value(s). The audio system generates an output audio signal based on (Continued)

modification of the band-specific signals, application of the linear filter(s) according to the parameter(s), and amplification using the gain amplifier(s) according to the gain value (s).

30 Claims, 11 Drawing Sheets

(56) References Cited

U.S. PATENT DOCUMENTS

| | | | | |
|---|---|---|---|---|
| 5,956,674 | A * | 9/1999 | Smyth | G10L 19/0208 704/503 |
| 6,691,082 | B1 * | 2/2004 | Aguilar | G10L 19/0208 704/219 |
| 10,741,192 | B2 * | 8/2020 | Rajendran | G10L 25/18 |
| 12,347,445 | B2 * | 7/2025 | Liang | G06N 3/09 |
| 2008/0040104 | A1 * | 2/2008 | Ide | G10L 19/087 704/219 |
| 2010/0057476 | A1 * | 3/2010 | Sudo | G10L 21/038 704/500 |
| 2011/0295598 | A1 * | 12/2011 | Yang | G10L 21/038 704/205 |
| 2012/0029926 | A1 | 2/2012 | Krishnan et al. | |
| 2013/0024191 | A1 * | 1/2013 | Krutsch | G10L 21/038 704/E19.01 |
| 2013/0144614 | A1 * | 6/2013 | Myllyla | G10L 19/0208 381/98 |
| 2015/0228288 | A1 * | 8/2015 | Subasingha | G10L 21/038 704/500 |
| 2016/0019902 | A1 | 1/2016 | Lamblin et al. | |
| 2016/0133273 | A1 * | 5/2016 | Kaniewska | G10L 21/038 704/205 |
| 2018/0308505 | A1 * | 10/2018 | Chebiyyam | G10L 21/038 |
| 2020/0251119 | A1 * | 8/2020 | Yang | G10L 21/0272 |
| 2021/0074308 | A1 | 3/2021 | Skordilis et al. | |
| 2023/0016637 | A1 * | 1/2023 | Schmidt | G06N 3/045 |
| 2023/0035504 | A1 * | 2/2023 | Lin | G10L 13/08 |
| 2025/0240590 | A1 * | 7/2025 | Marquardt | H04S 7/30 |

OTHER PUBLICATIONS

Valin, Jean-Marc, and Jan Skoglund. "LPCNet: Improving neural speech synthesis through linear prediction." ICASSP 2019-2019 IEEE International Conference on Acoustics, Speech and Signal Processing (ICASSP). IEEE, 2019.*

Schmidt, Konstantin. Blind Bandwidth Extension of Speech. Diss. Dissertation, Erlangen, Friedrich-Alexander-Universität Erlangen-Nürnberg (FAU), 2022, 2023.*

E. Song, K. Byun and H.-G. Kang, "ExcitNet Vocoder: A Neural Excitation Model for Parametric Speech Synthesis Systems," 2019 27th European Signal Processing Conference (EUSIPCO), A Coruna, Spain, 2019, pp. 1-5, doi: 10.23919/EUSIPCO.2019.8902701.*

International Search Report and Written Opinion—PCT/US2022/077868—ISA/EPO—Dec. 6, 2022.

Mccree A.V., et al., "A Mixed Excitation LPC Vocoder Model for Low Bit Rate Speech Coding", IEEE Transactions on Speech and Audio Processing, IEEE Service Center, New York, NY, US, vol. 3, No. 4, Jul. 1, 1995 (Jul. 1, 1995), pp. 242-249, XP000633068, ISSN: 1063-6676, DOI: 10.1109/89.397089, section 'II, The New LPC Vocoder Model, p. 243-p. 245.

Taiwan Search Report—TW111138882—TIPO—Apr. 30, 2026.

* cited by examiner

SYSTEMS AND METHODS FOR MULTI-BAND AUDIO CODING

CROSS-REFERENCE TO RELATED APPLICATIONS

This application for patent is a 371 of international Patent Application PCT/US2022/077868, filed Oct. 10, 2022, which claims priority to Greek Patent Application 20210100699, filed Oct. 14, 2021, all of which are hereby incorporated by referenced in their entirety and for all purposes.

FIELD

The present application is generally related to audio coding (e.g., audio encoding and/or decoding). For example, systems and techniques are described for performing audio coding at least in part by combining a linear time-varying filter generated by a machine learning system (e.g., a neural network based model) with a linear predictive coding (LPC) filter.

BACKGROUND

Audio coding (also referred to as voice coding and/or speech coding) is a technique used to represent a digitized audio signal using as few bits as possible (thus compressing the speech data), while attempting to maintain a certain level of audio quality. An audio or voice encoder is used to encode (or compress) the digitized audio (e.g., speech, music, etc.) signal to a lower bit-rate stream of data. The lower bit-rate stream of data can be input to an audio or voice decoder, which decodes the stream of data and constructs an approximation or reconstruction of the original signal. The audio or voice encoder-decoder structure can be referred to as an audio coder (or voice coder or speech coder) or an audio/voice/speech coder-decoder (codec).

Audio coders exploit the fact that speech signals are highly correlated waveforms. Some speech coding techniques are based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

BRIEF SUMMARY

Systems and techniques are described herein for audio coding. An audio system receives feature(s) corresponding an audio signal, for example from an encoder and/or a speech synthesis engine. The audio system generates an excitation signal, such as a harmonic signal and/or a noise signal, based on the feature(s). The audio system uses a filterbank to generate band-specific signals from the excitation signal. The band-specific signals correspond to frequency bands. The audio system inputs the feature(s) into a machine learning (ML) filter estimator to generate parameter(s) associated with linear filter(s). The audio system inputs the feature(s) into a voicing estimator to generate gain value(s). The audio system generates an output audio signal based on modification of the band-specific signals, application of the linear filter(s) according to the parameter(s), and amplification using the gain amplifier(s) according to the gain value(s).

In one example, an apparatus for audio coding is provided. The apparatus includes a memory and one or more processors (e.g., implemented in circuitry) coupled to the memory. The one or more processors are configured to and can: receive one or more features corresponding an audio signal; generate an excitation signal based on the one or more features; use a filterbank to generate a plurality of band-specific signals from the excitation signal, wherein the plurality of band-specific signals correspond to a plurality of frequency bands; use a machine learning (ML) filter estimator to generate one or more parameters associated with one or more linear filters in response to input of the one or more features to the ML filter estimator; use a voicing estimator to generate one or more gain values associated with one or more gain amplifiers in response to input of the one or more features to the voicing estimator; and generate an output audio signal based on modification of the plurality of band-specific signals, application of the one or more linear filters according to the one or more parameters, and amplification using the one or more gain amplifiers according to the one or more gain values.

In another example, a method of audio coding is provided. The method includes: receiving one or more features corresponding an audio signal; generating an excitation signal based on the one or more features; using a filterbank to generate a plurality of band-specific signals from the excitation signal, wherein the plurality of band-specific signals correspond to a plurality of frequency bands; using a machine learning (ML) filter estimator to generate one or more parameters associated with one or more linear filters in response to input of the one or more features to the ML filter estimator; using a voicing estimator to generate one or more gain values associated with one or more gain amplifiers in response to input of the one or more features to the voicing estimator; and generating an output audio signal based on modification of the plurality of band-specific signals, application of the one or more linear filters according to the one or more parameters, and amplification using the one or more gain amplifiers according to the one or more gain values.

In another example, a non-transitory computer-readable medium is provided that has stored thereon instructions that, when executed by one or more processors, cause the one or more processors to: receive one or more features corresponding an audio signal; generate an excitation signal based on the one or more features; use a filterbank to generate a plurality of band-specific signals from the excitation signal, wherein the plurality of band-specific signals correspond to a plurality of frequency bands; use a machine learning (ML) filter estimator to generate one or more parameters associated with one or more linear filters in response to input of the one or more features to the ML filter estimator; use a voicing estimator to generate one or more gain values associated with one or more gain amplifiers in response to input of the one or more features to the voicing estimator; and generate an output audio signal based on modification of the plurality of band-specific signals, application of the one or more linear filters according to the one or more parameters, and amplification using the one or more gain amplifiers according to the one or more gain values.

In another example, an apparatus for image processing is provided. The apparatus includes: means for receiving one or more features corresponding an audio signal; means for generating an excitation signal based on the one or more features; means for using a filterbank to generate a plurality of band-specific signals from the excitation signal, wherein the plurality of band-specific signals correspond to a plurality of frequency bands; means for using a machine learning (ML) filter estimator to generate one or more parameters associated with one or more linear filters in response to input of the one or more features to the ML filter estimator; means for using a voicing estimator to generate one or more gain values associated with one or more gain amplifiers in response to input of the one or more features to the voicing estimator; and means for generating an output audio signal based on modification of the plurality of band-specific signals, application of the one or more linear filters according to the one or more parameters, and amplification using the one or more gain amplifiers according to the one or more gain values.

In some aspects, the audio signal is a speech signal, and wherein the output audio signal is a reconstructed speech signal that is a reconstructed variant of the speech signal.

In some aspects, receiving the one or more features includes receiving the one or more features from an encoder that generates the one or more features at least in part by encoding the audio signal. In some aspects, receiving the one or more features includes receiving the one or more features from a speech synthesizer that generates the one or more features at least in part based on a text input, wherein the audio signal is an audio representation of a voice reading the text input.

In some aspects, the excitation signal is a harmonic excitation signal corresponding to a harmonic component of the audio signal. In some aspects, the excitation signal is a noise excitation signal corresponding to a noise component of the audio signal.

In some aspects, the ML filter estimator includes one or more trained ML models. In some aspects, the ML filter estimator includes one or more trained neural networks. In some aspects, the voicing estimator includes one or more trained ML models. In some aspects, the voicing estimator includes one or more trained neural networks.

In some aspects, generating the output audio signal includes combining the plurality of band-specific signals using a synthesis filterbank. In some aspects, generating the output audio signal includes modifying the plurality of band-specific signals by applying at least one of the one or more linear filters to each of the plurality of band-specific signals according to the one or more parameters. In some aspects, generating the output audio signal includes: combining the plurality of band-specific signals into a filtered signal; using a second filterbank to generate a second plurality of band-specific signals from the filtered signal, wherein the second plurality of band-specific signals correspond to a second plurality of frequency bands; modifying the second plurality of band-specific signals by applying at least one of the one or more gain amplifiers to each of the second plurality of band-specific signals according to the one or more gain values; and combining the second plurality of band-specific signals. In some aspects, generating the output audio signal includes: combining the plurality of band-specific signals into a filtered signal; and modifying the filtered signal by applying the one or more gain amplifiers to the filtered signal according to the one or more gain values.

In some aspects, generating the output audio signal includes modifying the plurality of band-specific signals by applying at least one of the one or more gain amplifiers to each of the plurality of band-specific signals according to the one or more gain values. In some aspects, generating the output audio signal includes: combining the plurality of band-specific signals into an amplified signal; using a second filterbank to generate a second plurality of band-specific signals from the amplified signal, wherein the second plurality of band-specific signals correspond to a second plurality of frequency bands; modifying the second plurality of band-specific signals by applying at least one of the one or more gain amplifiers to each of the second plurality of band-specific signals according to the one or more gain values; and combining the second plurality of band-specific signals. In some aspects, generating the output audio signal includes: combining the plurality of band-specific signals into an amplified signal; and modifying the amplified signal by applying the one or more gain amplifiers to the amplified signal according to the one or more gain values.

In some aspects, the one or more linear filters include one or more time-varying linear filters. In some aspects, the one or more linear filters include one or more time-invariant linear filters.

In some aspects, the methods, apparatuses, and computer-readable medium described above further comprise: modifying the output audio signal using an additional linear filter. In some aspects, the additional linear filter is time-varying. In some aspects, the additional linear filter is time-invariant. In some aspects, the additional linear filter is a linear predictive coding (LPC) filter.

In some aspects, the methods, apparatuses, and computer-readable medium described above further comprise: modifying the excitation signal using an additional linear filter before using the filterbank to generate the plurality of band-specific signals from the excitation signal. In some aspects, the additional linear filter is time-varying. In some aspects, the additional linear filter is time-invariant. In some aspects, the additional linear filter is a linear predictive coding (LPC) filter.

In some aspects, the one or more features include one or more log-mel-frequency spectrum features.

In some aspects, the one or more parameters associated with one or more linear filters include an impulse response associated with the one or more linear filters. In some aspects, the one or more parameters associated with one or more linear filters include a frequency response associated with the one or more linear filters. In some aspects, the one or more parameters associated with one or more linear filters include a rational transfer function coefficient associated with the one or more linear filters.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
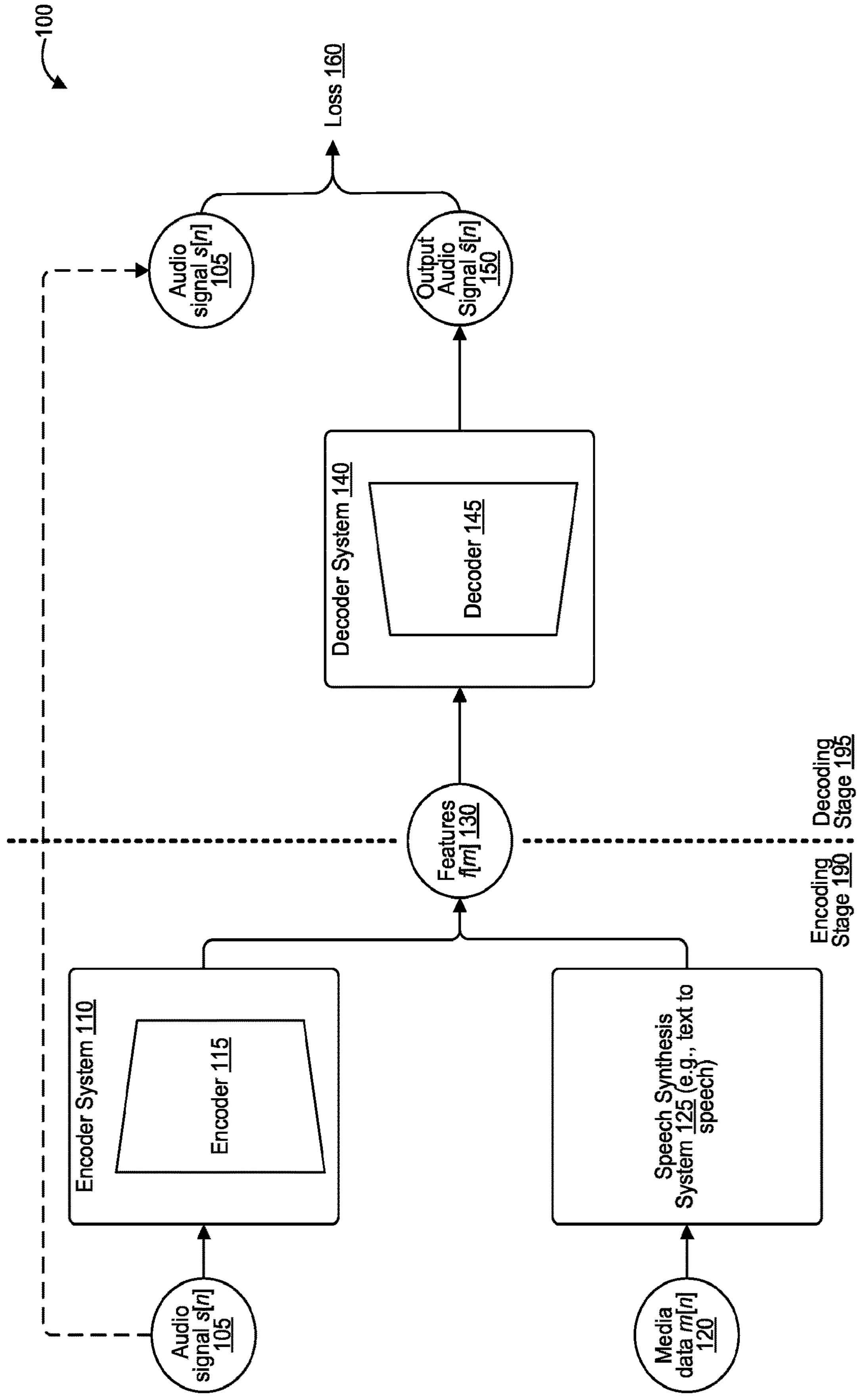
FIG. 1 is a block diagram illustrating an example architecture of a codec system with an encoding stage and a decoding stage, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Audio encoding (e.g., speech coding, music signal coding, or other type of audio coding) can be performed on a digitized audio signal (e.g., a speech signal) to compress the amount of data for storage, transmission, and/or other use. Audio decoding can decoded encoded audio data to reconstruct the audio signal as accurately as possible.

Systems and techniques are described for audio coding. An audio system receives feature(s) corresponding an audio signal, for example from an encoder and/or a speech synthesis engine. The audio system generates an excitation signal, such as a harmonic signal and/or a noise signal, based on the feature(s). The audio system uses a filterbank to generate band-specific signals from the excitation signal. The band-specific signals correspond to frequency bands. The audio system inputs the feature(s) into a machine learning (ML) filter estimator to generate parameter(s) associated with linear filter(s). The audio system inputs the feature(s) into a voicing estimator to generate gain value(s). The audio system generates an output audio signal based on modification of the band-specific signals, application of the linear filter(s) according to the parameter(s), and amplification using the gain amplifier(s) according to the gain value(s).

The systems and techniques for audio coding disclosed herein provide various technical improvements over other systems and techniques for audio coding. For instance, the systems and techniques for audio coding disclosed herein can provide improved quality of audio signals, such as speech signals, compared to other systems and techniques that do not apply linear filter(s) and/or gain amplifier(s) differently to different frequency bands of excitation signals. The systems and techniques for audio coding disclosed herein can provide audio signals (e.g., speech signals) with reduced and/or attenuated overvoicing compared to other systems and techniques that do not apply linear filter(s) and/or gain amplifier(s) differently to different frequency bands of excitation signals. The systems and techniques for audio coding disclosed herein can provide audio signals (e.g., speech signals) with reduced and/or attenuated overharmonicity compared to other systems and techniques that do not apply linear filter(s) and/or gain amplifier(s) differently to different frequency bands of excitation signals. The systems and techniques for audio coding disclosed herein can provide audio signals (e.g., speech signals) with reduced and/or attenuated audio artifacts (e.g., metallic and/or robotic character to voice sound) compared to other systems and techniques that do not apply linear filter(s) and/or gain amplifier(s) differently to different frequency bands of excitation signals. The systems and techniques for audio coding disclosed herein can generate and/or reconstruct output audio signals with reduced and/or attenuated complexity compared to systems and techniques for audio coding that rely on machine learning (ML) systems in place of one or more of the linear filter(s) described in the systems and techniques for audio coding disclosed herein.

Various aspects of the application will be described with respect to the figures. FIG. 1 is a block diagram 100 illustrating an example architecture of a codec system with an encoding stage 190 and a decoding stage 195. The codec system of FIG. 1 can be referred to as a voice coding system, a voice coder, a voice coder and/or decoder (codec), a voice codec system, a speech coding system, a speech coder, a speech codec, a speech codec system, an audio coding system, an audio coder, an audio codec, an audio codec system, or a combination thereof. In some examples, the codec system includes one or more computing systems 1000. The codec system performs an audio coding process with an encoding stage 190 and a decoding stage 195. The encoding stage 190 of the audio coding process outputs feature(s) f[m] 130. The decoding stage 195 of the audio coding process receives the feature(s) f[m] 130 as an input, and outputs an output audio signal ŝ[n] 150.

In some examples, the codec system includes an encoder system 110. In some examples, the encoder system 110 includes one or more computing systems 1000. The encoder system 110 includes an encoder 115. The encoder system 110 receives an audio signal s[n] 105. The audio signal s[n] 105 can represent audio at a time (e.g., along a time axis) n. In some examples, the audio signal s[n] 105 is a speech signal. In some examples, the audio signal s[n] 105 can include a digitized speech signal generated from an analog speech signal from an audio source (e.g., a microphone, a communication receiver, and/or a user interface). In some examples, the speech signal includes an audio representation of a voice saying a phrase that includes one or more words and/or characters. In some examples, the audio signal s[n] 105 can be processed by the encoder system 110 using a filter to eliminate aliasing, a sampler to convert to discrete-time, and an analog-to-digital converter for converting the analog signal to the digital domain. In some examples, the audio signal s[n] 105 is a discrete-time speech signal with sample values (referred to herein as samples) that are also discretized.

Samples of the audio signal s[n] 105 can be divided into blocks of N samples each, where a block of N samples is referred to as a frame. In one illustrative example, each frame can be 10-20 milliseconds (ms) in length. In some examples, the time n corresponding to the audio signal s[n] 105 and/or the output audio signal ŝ[n] 150 can represent a time corresponding to a specific set of one or more frames, such as a frame m. In some examples, the features f[m] 130 correspond to a frame m that includes the time n.

The encoder system 110 uses the audio signal s[n] 105 as an input to the encoder 115. The encoder system 110 uses the encoder 115 to determine, quantize, estimate, and/or generate the features f[m] 130 in response to input of the audio signal s[n] 105 to the encoder 115. The features f[m] 130 can represent a compressed signal (including a lower bit-rate stream of data) that represents the audio signal s[n] 105 using as few bits as possible, while attempting to maintain a certain quality level for the speech. The encoder 115 can use any suitable audio and/or voice coding algorithm, such as a linear prediction coding algorithm (e.g., Code-excited linear prediction (CELP), algebraic-CELP (ACELP), or other linear prediction technique) or other voice coding algorithm.

The encoder 115 can compress the audio signal s[n] 105 in an attempt to reduce the bit-rate of the audio signal s[n] 105. The bit-rate of a signal is based on the sampling frequency and the number of bits per sample. For instance, the bit-rate of a speech signal can be determined as follows:

$$BR = S * b,$$

Where BR is the bit-rate, S is the sampling frequency, and b is the number of bits per sample. In one illustrative example, at a sampling frequency (S) of 8 kilohertz (kHz) and at 16 bits per sample (b), the bit-rate of a signal would be a bit-rate of 128 kilobits per second (kbps).

In some examples, the codec system includes a speech synthesis system 125. In some examples, the speech synthesis system 125 includes one or more computing systems 1000. The encoder system 110 receives media data m[n] 120. In some examples, the media data m[n] 120 includes a string of text and/or alphanumeric characters. In some examples, the media data m[n] 120 includes an image that depicts a string of text and/or alphanumeric characters. In some examples, the string of text and/or alphanumeric characters of the media data m[n] 120 includes a phrase that includes one or more words and/or characters. The speech synthesis system 125 uses the media data m[n] 120 as an input for speech synthesis. The speech synthesis system 125 uses speech synthesis to generate the features f[m] 130 in response to input of the media data m[n] 120 to the speech synthesis system 125. In some examples, the features f[m] 130 are features of an audio representation of a voice reading the string of text and/or alphanumeric characters in the media data m[n] 120. In some examples, the speech synthesis system 125 generates the features f[m] 130 from the media data m[n] 120 using a speech synthesis algorithm, such as text-to-speech (TTS) algorithm, a speech computer algorithm, a speech synthesizer algorithm, a concatenation synthesis algorithm, a unit selection synthesis algorithm, a diphone synthesis algorithm, a domain-specific synthesis algorithm, an articulatory synthesis algorithm, a hidden Markov model (HMM) based synthesis algorithm, a sinewave synthesis algorithm, a deep learning based synthesis algorithm, a self-supervised learning synthesis algorithm, a zero-shot speaker adaptation synthesis algorithm, a neural vocoder synthesis algorithm, or a combination thereof.

The codec system includes a decoder system 140. In some examples, the decoder system 140 includes one or more computing systems 1000. The decoder system 140 includes a decoder 145. The decoder system 140 receives the features f[m] 130. In some examples, the decoder system 140 receives the features f[m] 130 from the encoder system 110. In some examples, the decoder system 140 receives the features f[m] 130 from the speech synthesis system 125. In some examples, the features f[m] 130 correspond to the audio signal s[n] 105 (e.g., a speech signal) and/or to the media data m[n] 120 (e.g., a string of text and/or alphanumeric characters). The decoder system 140 uses the features f[m] 130 as an input to the decoder 145. The decoder system 140 uses the decoder 145 to generate the output audio signal ŝ[n] 150 in response to input of the features f[m] 130 to the decoder 145. The output audio signal ŝ[n] 150 can be referred to as a reconstructed speech signal. The output audio signal ŝ[n] 150 can be a reconstructed variant of the audio signal s[n] 105 (e.g., the speech signal). The output audio signal ŝ[n] 150 can approximate the audio signal s[n] 105 (e.g., the speech signal). In such examples, codec system can determine a loss 160 to be a difference between the audio signal s[n] 105 and the output audio signal ŝ[n] 150 for a time n.

In some examples, the features f[m] 130 represent a compressed speech signal that can be stored and/or sent to the decoder system 140 from the encoder system 110 and/or the speech synthesis system 125. In some examples, the decoder system 140 can communicate with the encoder system 110 and/or the speech synthesis system 125, such as to request speech data, send feedback information, and/or provide other communications to the encoder system 110 and/or the speech synthesis system 125. In some examples, the encoder system 110 and/or the speech synthesis system 125 can perform channel coding on the compressed speech signal before the compressed speech signal is sent to the decoder system 140. For instance, channel coding can provide error protection to the bitstream of the compressed speech signal to protect the bitstream from noise and/or interference that can occur during transmission on a communication channel.

In some examples, the decoder 145 can decode and/or decompress the encoded and/or compressed variant of the audio signal s[n] 105 represented by the features f[m] 130 to generate the output audio signal ŝ[n] 150. In some examples, the output audio signal ŝ[n] 150 includes a digitized, discrete-time signal that can have the same or similar bit-rate as that of the audio signal s[n] 105. The decoder 145 can use an inverse of the audio and/or voice coding algorithm used by the encoder 115, which as noted above can include any suitable audio encoding algorithm, such as a linear prediction coding algorithm (e.g., CELP, ACELP, or other suitable linear prediction technique) or other audio and/or voice coding algorithm. In some cases, the output audio signal ŝ[n] 150 can be converted to continuous-time analog signal by the decoder system 140, such as by performing digital-to-analog conversion and anti-aliasing filtering.

The codec system can exploit the fact that speech signals are highly correlated waveforms. The samples of an input speech signal can be divided into blocks of N samples each, where a block of N samples is referred to as a frame. In one illustrative example, each frame can be 10-20 milliseconds (ms) in length. In some examples, the time n corresponding to the audio signal s[n] 105, the features f[m] 130, and/or the output audio signal ŝ[n] 150 can represent a time corresponding to a specific set of one or more frames. Various voice coding algorithms can be used to encode a speech signal, such as the audio signal s[n] 105. For instance, code-excited linear prediction (CELP) is one example of a voice coding algorithm. The CELP model is based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

In general, CELP uses a linear prediction (LP) model to model the vocal tract, and uses entries of a fixed codebook (FCB) as input to the LP model. For instance, long-term linear prediction can be used to model pitch of a speech signal, and short-term linear prediction can be used to model the spectral shape (phoneme) of the speech signal. Entries in the FCB are based on coding of a residual signal that remains after the long-term and short-term linear prediction modeling is performed. For example, long-term linear prediction and short-term linear prediction models can be used for speech synthesis, and a fixed codebook (FCB) can be searched during encoding to locate the best residual for input to the long-term and short-term linear prediction models. The FCB provides the residual speech components not captured by the short-term and long-term linear prediction models. A residual, and a corresponding index, can be selected at the encoder based on an analysis-by-synthesis process that is performed to choose the best parameters so as to match the original speech signal as closely as possible. The index can be sent to the decoder 145, which can extract the corresponding LTP residual from the FCB based on the index.

In some examples, the features f[m] 130 represent linear prediction (LP) coefficients, pitch, gain, prediction error, pitch lag, period, pitch correlation, Bark cepstral coefficients, log-Mel spectrograms, fundamental frequencies, and/or combinations thereof. Examples of the decoder system 140, and/or of the decoder 145, and/or portions thereof, are illustrated in FIGS. 2, 3, 4, 5, 6, 7A, 7B, and 8.

Figure 2:
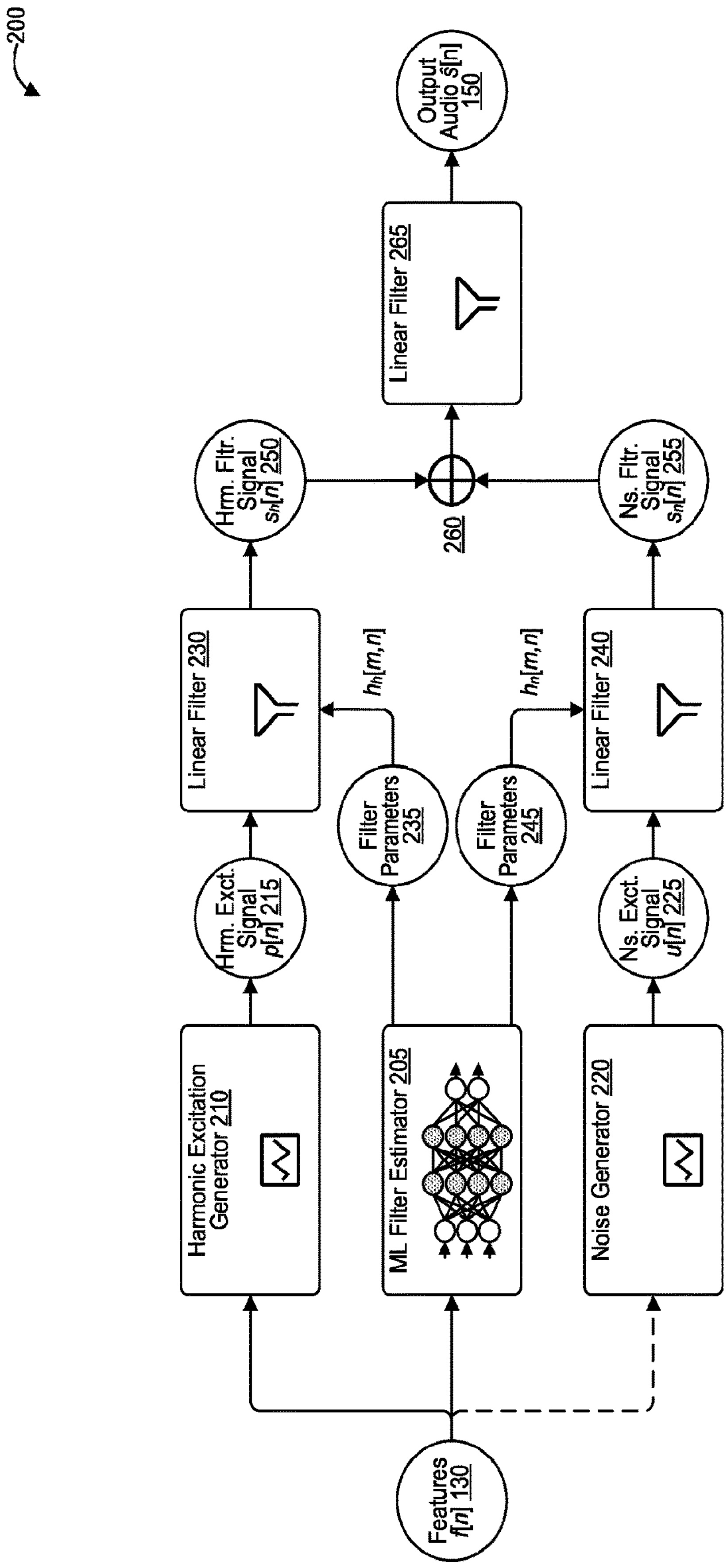
FIG. 2 is a block diagram illustrating an example of a codec system utilizing a machine learning (ML) filter estimator to generate filter parameters for a linear filter for a harmonic excitation signal and to generate filter parameters for a linear filter for a noise excitation signal, in accordance with some examples.

FIG. 2 is a block diagram 200 illustrating an example of a codec system utilizing a machine learning (ML) filter estimator 205 to generate filter parameters 235 for a linear filter 230 for a harmonic excitation signal p[n] 215 and to generate filter parameters 245 for a linear filter 240 for a noise excitation signal u[n] 225. The codec system of FIG. 2 can be an example of at least a portion of the decoder system 140 and/or at least a portion of the decoder 145. The codec system receives the features f[m] 130. In some examples, the codec system of FIG. 2 can be a neural homomorphic vocoder.

The codec system of FIG. 2 includes a harmonic excitation generator 210. The harmonic excitation generator 210 can be referred to as an impulse train generator. The harmonic excitation generator 210 receives the features f[m] 130 as an input. The harmonic excitation generator 210 generates a harmonic excitation signal p[n] 215 based on the features f[m] 130, in response to receiving the features f[m] 130 as an input. The harmonic excitation signal p[n] 215 can be referred to as an impulse train. The harmonic excitation generator 210 can generate the harmonic excitation signal p[n] 215 based on pitch and/or pitch period. The pitch and/or pitch period may be time-varying, and thus may differ based on the time n. In some examples, the pitch and/or pitch period are included as one or more of the features f[m] 130. In some examples, the features f[m] 130 are missing pitch and/or pitch period as feature(s), but the harmonic excitation generator 210 determines and/or estimates the pitch and/or pitch period based on the features f[m] 130. The pitch and/or pitch period can match, be based on, or otherwise be associated with a pitch and/or pitch period of a voice/speech in the audio signal s[n] 105. The pitch and/or pitch period can be determined and/or estimated by the speech synthesis system 125 based on a string of text and/or characters in the media data m[n] 120. In some examples, the harmonic excitation generator 210 can include a pitch tracker that identifies the pitch and/or pitch period from, and/or based on, the features f[m] 130.

The codec system of FIG. 2 includes a noise generator 220. In some examples, the noise generator 220 receives the features f[m] 130 as an input. In some examples, the noise generator 220 does not receive the features f[m] 130 as input. The noise generator 220 generates a noise excitation signal u[n] 225. In some examples, the noise generator 220 generates the noise excitation signal u[n] 225 based on the features f[m] 130, in response to receiving the features f[m] 130 as an input. In some examples, the noise generator 220 generates the noise excitation signal u[n] 225 without any basis on features f[m] 130. In some examples, the noise generator 220 includes a random noise generator. In some examples, the noise excitation signal u[n] 225 includes random noise. In some examples, the noise generator 220 can sample the noise excitation signal u[n] 225 from a Gaussian distribution.

The codec system of FIG. 2 includes a linear filter 230 for the harmonic excitation signal p[n] 215. The codec system of FIG. 2 includes a linear filter 240 for the noise excitation signal p[n] 225. The codec system of FIG. 2 includes a machine learning (ML) filter estimator 205. The ML filter estimator 205 receives the features f[m] 130 as an input. The ML filter estimator 205 generates one or more filter parameters 235 corresponding to the frame m and/or the time n for the linear filter 230 based on the features f[m] 130 for frame m corresponding to time n, in response to receiving the features f[m] 130 for frame m corresponding to time n as an input. The filter parameters 235 may include an impulse response $h_h[m,n]$. The ML filter estimator 205 generates one or more filter parameters 245 corresponding to the frame m and/or the time n for the linear filter 240 based on the features f[m] 130 for time n, in response to receiving the features f[m] 130 for time n as an input. The filter parameters 235 may include an impulse response $h_n[m,n]$. The filter parameters 235 and/or the filter parameters 245 can include, for example, impulse response, frequency response, rational transfer function coefficients, or combinations thereof.

The ML filter estimator 205 can include one or more trained ML models. In some examples, the ML filter estimator 205, and/or the one or more trained ML models of the ML filter estimator 205, can include, for example, one or more neural network (NNs) (e.g., neural network 800), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

In some examples, the linear filter 230 is time-varying (e.g., per frame), for instance because the ML filter estimator 205 updates the linear filter 230 for each time n (e.g., for each frame) by providing the one or more filter parameters 235 for the time n. In examples where the linear filter 230 is time-varying, the linear filter 230 can be referred to as a linear time-varying (LTV) filter and/or as a harmonic LTV filter. In some examples, the linear filter 240 is time-varying (e.g., per frame), for instance because the ML filter estimator 205 updates the linear filter 240 for each time n (e.g., for each frame) by providing the one or more filter parameters 245 for the time n. In examples where the linear filter 240 is time-varying, the linear filter 240 can be referred to as an LTV filter and/or as a noise LTV filter. Time, as discussed with respect to these linear time-varying (LTV) filters, can refer to a signal time axis, not to wall or processing time.

The linear filter 230 receives the harmonic excitation signal p[n] 215 as input from the harmonic excitation generator 210. The linear filter 230 receives the filter parameters 235 as input from the ML filter estimator 205. The linear filter 230 generates a harmonic filtered signal $s_h[n]$ 250 by filtering the harmonic excitation signal p[n] 215 using the linear filter 230 according to the filter parameters 235.

The linear filter 240 receives the noise excitation signal u[n] 225 as input from the noise generator 220. The noise generator 220 can be referred to as a noise excitation generator 220. The linear filter 240 receives the filter parameters 245 as input from the ML filter estimator 205. The linear filter 240 generates a noise filtered signal $s_n[n]$ 255 by filtering the noise excitation signal u[n] 225 using the linear filter 240 according to the filter parameters 245.

The codec system of FIG. 2 includes an adder 260. The adder 260 combines the harmonic filtered signal $s_h[n]$ 250 and the noise filtered signal $s_n[n]$ 255 into a combined audio signal, for instance by summing, adding, and/or otherwise combining the signals. The codec system of FIG. 2 includes a linear filter 265. The linear filter 265 can be time-varying or time-invariant. The linear filter 265 receives the combined audio signal as an input. The linear filter 265 generates the output audio signal ŝ[n] 150 by filtering the combined audio signal. The linear filter 265 can be referred to as a post-filter. In some examples, the linear filter 265 is a linear predictive coding (LPC) filter.

In some examples, the linear filter 265 can be applied to the harmonic excitation signal p[n] 215 before the harmonic excitation signal p[n] 215 is filtered using the linear filter 230 instead of or in addition to being applied to the combined audio signal. In some examples, the linear filter 265 can be applied to the noise excitation signal u[n] 225 before the noise excitation signal u[n] 225 is filtered using the linear filter 240 instead of or in addition to being applied to the combined audio signal. In some examples, the linear filter 265 can be applied to the harmonic filtered signal $s_h[n]$ 250 before generation of the combined audio signal instead of or in addition to being applied to the combined audio signal. In some examples, the linear filter 265 can be applied to the noise filtered signal $s_n[n]$ 255 before generation of the combined audio signal instead of or in addition to being applied to the combined audio signal. The linear filter 265 can be referred to as a pre-filter. In some examples, the linear filter 265 represents the effect(s) of glottal pulse, vocal tract, and/or radiation in speech production.

The codec system of FIG. 2 can reconstruct and/or generate the output audio signal ŝ[n]150 based on a harmonic component and a noise component that are controlled using the ML filter estimator 205, a process that may be referred to as differentiable digital signal processing (DDSP). The harmonic component may include periodic vibrations in voiced sounds. The harmonic component may be modeled using the harmonic excitation signal p[n] 215 filtered using a linear filter 230. The noise component may include background noise, unvoiced sounds, and/or the stochastic component in voiced sounds. The noise component may be modeled using the harmonic excitation signal p[n] 215 filtered using a linear filter 230.

As noted above with respect to FIG. 1, the features f[m] 130 correspond to a frame m that includes the time n. The audio signal s[n] 105 and the output audio signal ŝ[n] 150 can be divided into non-overlapping frames with frame length L. In some examples, the frame index is m, the discrete time index is n, and a feature index is c. The total number of frames (M) and total number of sampling points (N) may follow N=M×L. In $f_0$, S, $h_h$, $h_n$, 0≤m<M−1. The terms s, p, u, $s_h$, $s_n$ may be finite duration signals, in which 0≤n<N−1. Impulse responses $h_h$, and $h_n$ may be infinitely long, in which $n\in\mathbb{Z}$. Impulse response h may be causal, in which $n\in\mathbb{Z}$ EZ and n≥0.

To perform the speech synthesis process, the harmonic excitation generator 210 can generate the harmonic excitation signal p[n] 215 from a frame-wise fundamental frequency $f_0[m]$ identified based on the features f[m] 130 by the pitch tracker of the harmonic excitation generator 210. In an illustrative example, the harmonic excitation generator 210 can generate the harmonic excitation signal p[n] 215 to be alias-free and discrete in time using additive synthesis. For instance, as illustrated in equation (1) below, the harmonic excitation generator 210 can use a low-passed sum of sinusoids to generate a harmonic excitation signal p(t):

$$p(t) = \begin{cases} \sum_{k=1}^{2kf_0(t)<f_s} \cos\left(\int_0^t 2\pi k\, f_0(\tau)d\tau\right) \\ \text{if } f_0(t) > 0 \\ 0, \text{ if } f_0(t) = 0 \end{cases}, \quad (1)$$

where $f_0(t)$ is reconstructed from $f_0[m]$ with zero-order hold or linear interpolation, $p[n]=p(n/f_s)$, and $f_s$ is the sampling rate. In some cases, the computationally complexity of additive synthesis can be reduced with approximations. For example, the harmonic excitation generator 210 or other component (e.g., a processor) of the codec system can round the fundamental periods to the nearest multiples of the sampling period. In such an example, the harmonic excitation signal p[n] 215 is discrete and/or sparse. The harmonic excitation generator 210 can generate the monic excitation signal p[n] 215 sequentially (e.g., one pitch mark at a time).

The ML filter estimator 205 can estimate impulse response $h_h t[m, n]$ (as part of the filter parameters 235) and $h_n[m, n]$ (as part of the filter parameters 245) for each frame, given the features f[m] 130 extracted by the feature extraction engine from the input X[n]. In some aspects, complex cepstrums ($\hat{h}_h$ and $\hat{h}_n$) can be used as the internal description of impulse responses ($h_h$ and $h_n$) for the ML filter estimator 205. Complex cepstrums describe the magnitude response and the group delay of filters simultaneously. The group delay of filters can affect the timbre of speech. In some cases, instead of using linear-phase or minimum-phase filters, the ML filter estimator 205 can use mixed-phase filters, with phase characteristics learned from the dataset.

In some examples, the length of a complex cepstrum can be restricted, essentially restricting the levels of detail in the magnitude and phase response. Restricting the length of a complex cepstrum can be used to control the complexity of the filters. In some examples, the ML filter estimator 205 can predict low-frequency coefficients, in which the high-frequency cepstrum coefficients can be set to zero. The axis of the cepstrum can referred to as the quefrency. In some cases, the ML filter estimator 205 can predict low-quefrency coefficients, in which the high-quefrency cepstrum coefficients can be set to zero. In an illustrative example, two 10 millisecond (ms) long complex cepstrums are predicted in each frame. In some cases, the ML filter estimator 205 can use a discrete Fourier transform (DFT) and an inverse-DFT (IDFT) to generate the impulse responses $h_h$ and $h_n$. In some cases, the ML filter estimator 205 can approximate an infinite impulse response (IIR) ($h_e[m, n]$ and $h_n[m, n]$) using Finite impulse responses (FIRs). The DFT size can be set to at least a threshold size (e.g., N=1024) to avoid aliasing.

Figure 3:
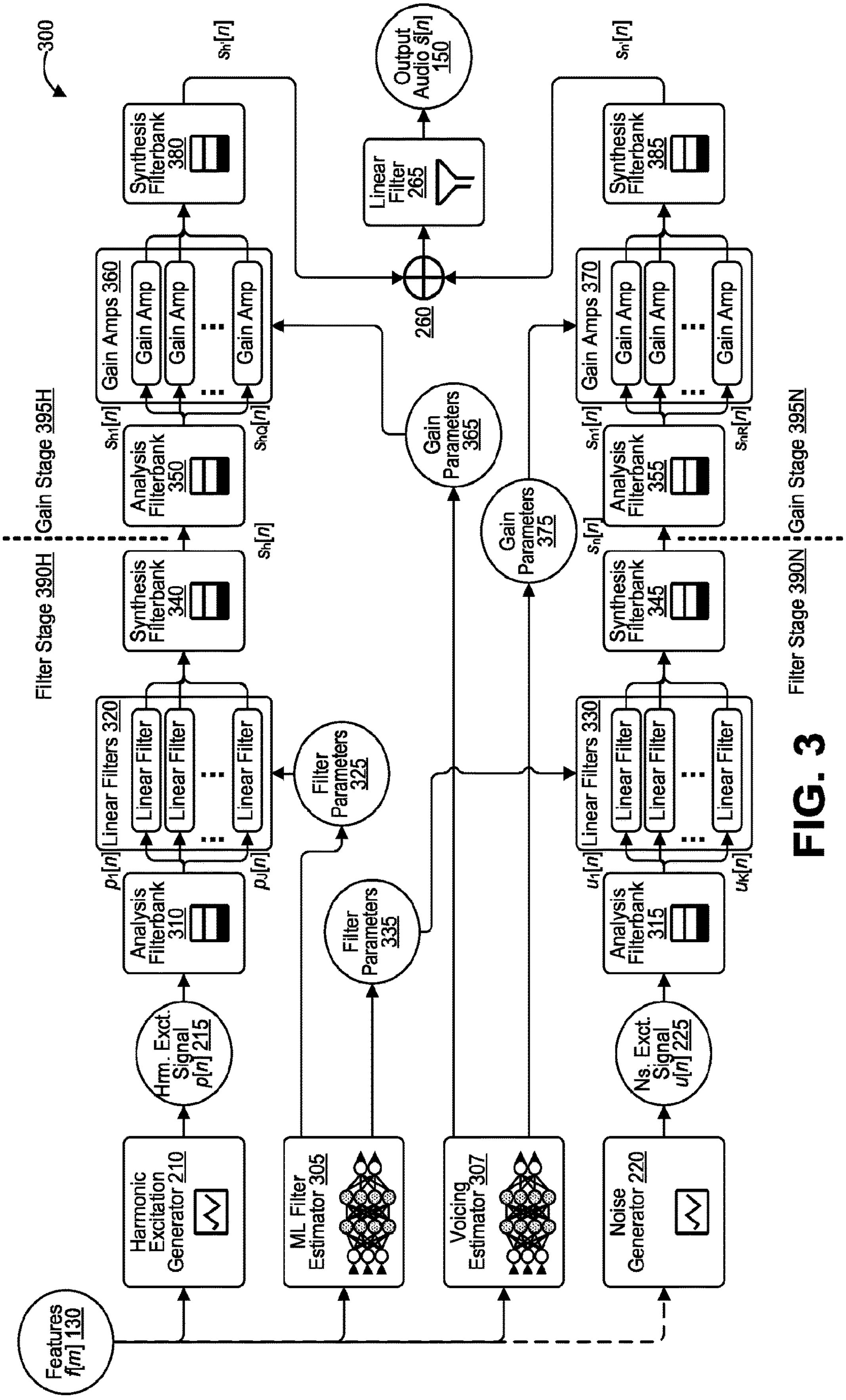
FIG. 3 is a block diagram illustrating an example of a codec system utilizing a machine learning (ML) filter estimator to generate filter parameters for linear filters for a harmonic excitation signal and to generate filter parameters for linear filters for a noise excitation signal, and utilizing a voicing estimator to generate gain parameters for gain amplifiers for the harmonic excitation signal and to generate gain parameters for gain amplifiers for the noise excitation signal, in accordance with some examples.

FIG. 3 is a block diagram 300 illustrating an example of a codec system utilizing a machine learning (ML) filter estimator 305 to generate filter parameters 325 for linear filters 320 for a harmonic excitation signal 215 and to generate filter parameters 335 for linear filters 320 for a noise excitation signal 225, and utilizing a voicing estimator 307 to generate gain parameters 365 for gain amplifiers 360 for the harmonic excitation signal 215 and to generate gain parameters 375 for gain amplifiers 370 for the noise excitation signal 225. The codec system of FIG. 3 can be an example of at least a portion of the decoder system 140 and/or at least a portion of the decoder 145. The codec system receives the features f[m] 130.

The codec system of FIG. 3 includes the harmonic excitation generator 210 of FIG. 2, that generates the harmonic excitation signal p[n] 215 based on the features f[m] 130. The codec system of FIG. 3 includes the noise generator 220 of FIG. 2, that generates the noise excitation signal u[n] 225 based on the features f[m] 130.

The codec system of FIG. 3 includes an analysis filterbank 310. The analysis filterbank 310 can receive the harmonic excitation signal p[n] 215 as an input. The analysis filterbank 310 can include an array of bandpass filters the separates its input signal into multiple components corresponding to multiple frequency bands, each frequency band being a sub-band of a frequency band of the input signal. The analysis filterbank 310 uses its array of bandpass filters to separate the harmonic excitation signal p[n] 215 into J component signals, denoted as $p_1[n]$, $p_2[n]$, . . . $p_J[n]$. The codec system of FIG. 3 includes a set of linear filters 320. The linear filters 320 include J linear filters, with one linear filter for each of the J component signals. For instance, the linear filters 320 can include a linear filter for $p_1[n]$, a linear filter for $p_2[n]$, a linear filter for $p_J[n]$, and linear filters for each component signal for bands between $p_2[n]$ and $p_J[n]$.

The codec system of FIG. 3 includes an analysis filterbank 315. The analysis filterbank 315 can receive the noise excitation signal u[n] 225 as an input. The analysis filterbank 315 can include an array of bandpass filters that separates its input signal into multiple components corresponding to multiple frequency bands, each frequency band being a sub-band of a frequency band of the input signal. The analysis filterbank 315 uses its array of bandpass filters to separate the noise excitation signal u[n] 225 into K component signals, denoted as $u_1[n]$, $u_2[n]$, . . . $u_K[n]$. The codec system of FIG. 3 includes a set of linear filters 330. The linear filters 330 include K linear filters, with one linear filter for each of the K component signals. For instance, the linear filters 330 can include a linear filter for $u_1[n]$, a linear filter for $u_2[n]$, a linear filter for $u_K[n]$, and linear filters for each component signal for bands between $u_2[n]$ and $u_K[n]$.

The codec system of FIG. 3 includes an ML filter estimator 305. The ML filter estimator 305 receives the features f[m] 130 as an input. The ML filter estimator 305 can be an example of the ML filter estimator 205, but modified to provide separate filter parameters for different component signals corresponding to different bands. For instance, the ML filter estimator 305 generates the filter parameters 325 for the linear filters 320, and generates the filter parameters 335 for the linear filters 330. The filter parameters 325 can be different for different linear filters of the linear filters 320. For example, the filter parameters 325 can include a first set of filter parameters for a first linear filter of the linear filters 320, a second set of filter parameters for a second linear filter of the linear filters 320, and so on, until a Jth set of filter parameters for a Jth linear filter of the linear filters 320. Similarly, the filter parameters 335 can be different for different linear filters of the linear filters 330. For example, the filter parameters 335 can include a first set of filter parameters for a first linear filter of the linear filters 330, a second set of filter parameters for a second linear filter of the linear filters 330, and so on, until a Kth set of filter parameters for a Kth linear filter of the linear filters 330. The ML filter estimator 205 can include one or more trained ML models. In some examples, the ML filter estimator 205, and/or the one or more trained ML models of the ML filter estimator 205, can include, for example, one or more neural network (NNs) (e.g., neural network 800), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The codec system of FIG. 3 applies the linear filters 320 to the J component signals $p_1[n]$, $p_2[n]$, . . . $p_J[n]$ of the harmonic excitation signal p[n] 215 (as output by the analysis filterbank 310) according to the filter parameters 325 to generate J filtered component signals. For instance, the codec system of FIG. 3 applies a first filter of the linear filters 320 to the first component signal $p_1[n]$ according to a first set of filter parameters of the filter parameters 325, applies a second filter of the linear filters 320 to the second component signal $p_2[n]$ according to a second set of filter parameters of the filter parameters 325, and so forth. The linear filters 320 can be linear time-varying (LTV) filters, for instance varying based on time n and/or frame m. The codec system of FIG. 3 includes a synthesis filterbank 340. The synthesis filterbank 340 combines the filtered component signals into a combined signal with a frequency band matching (or similar to) the frequency band of the harmonic excitation signal p[n] 215. The synthesis filterbank 340 outputs the combined signal, which may be referred to as a filtered harmonic excitation signal $s_h[n]$. In some cases, the application of the analysis filterbank 310, the linear filters 320, and/or the synthesis filterbank 340 to the harmonic excitation signal p[n] 215 can be referred to as a filter stage 390H of a decoding process. The filter stage 390H of the decoding process can be followed by a gain stage 395H of the decoding process.

The codec system of FIG. 3 applies the linear filters 330 to the K component signals $u_1[n]$, $u_2[n]$, . . . $u_K[n]$ of the noise excitation signal u[n] 225 (as output by the analysis filterbank 315) according to the filter parameters 335 to generate K filtered component signals. For instance, the codec system of FIG. 3 applies a first filter of the linear filters 330 to the first component signal $u_1[n]$ according to a first set of filter parameters of the filter parameters 335, applies a second filter of the linear filters 330 to the second component signal $u_2[n]$ according to a second set of filter parameters of the filter parameters 335, and so forth. The linear filters 330 can be linear time-varying (LTV) filters, for instance varying based on time n and/or frame m. The codec system of FIG. 3 includes a synthesis filterbank 345. The synthesis filterbank 345 combines the filtered component signals into a combined signal with a frequency band matching (or similar to) the frequency band of the noise excitation signal u[n] 225. The synthesis filterbank 345 outputs the combined signal, which may be referred to as a filtered noise excitation signal $s_n[n]$. In some cases, the application of the analysis filterbank 315, the linear filters 330, and/or the synthesis filterbank 345 to the noise excitation signal u[n] 225 can be referred to as a filter stage 390N of a decoding process. The filter stage 390N of the decoding process can be followed by a gain stage 395N of the decoding process.

The ML filter estimator 305 generates one or more filter parameters 325 corresponding to the frame m and/or the time n for the linear filter 320 based on the features f[m] 130 for frame m corresponding to time n, in response to receiving the features f[m] 130 for frame m corresponding to time n as an input. The filter parameters 325 may include an impulse response $h_h[m,n]$. The ML filter estimator 305 generates one or more filter parameters 335 corresponding to the frame m and/or the time n for the linear filter 330 based on the features f[m] 130 for time n, in response to receiving the features f[m] 130 for time n as an input. The filter parameters 335 may include an impulse response $h_n[m,n]$. The filter parameters 325 and/or the filter parameters 335 can include, for example, impulse response, frequency response, rational transfer function coefficients, or combinations thereof.

The codec system of FIG. 3 includes an analysis filterbank 350. The analysis filterbank 350 can receive the filtered harmonic excitation signal $s_h[n]$ from the synthesis filterbank 340 as an input. The analysis filterbank 350 uses its array of bandpass filters to separate the filtered harmonic excitation signal $s_h[n]$ into Q component signals, denoted as $s_{h1}[n]$, $s_{h2}[n]$, . . . $s_{hQ}[n]$. The codec system of FIG. 3 includes a set of gain amplifiers 360. The gain amplifiers 360 include Q gain amplifiers, with one gain amplifier for each of the Q component signals. For instance, the gain amplifiers 360 can include a gain amplifier for $s_{h1}[n]$, a gain amplifier for $s_{h2}[n]$, a gain amplifier for $s_{hQ}[n]$, and gain amplifiers for each component signal for bands between $s_{h2}[n]$ and $s_{hQ}[n]$.

The codec system of FIG. 3 includes an analysis filterbank 355. The analysis filterbank 355 can receive the filtered noise excitation signal $s_n[n]$ from the synthesis filterbank 345 as an input. The analysis filterbank 355 uses its array of bandpass filters to separate the filtered noise excitation signal $s_n[n]$ into R component signals, denoted as $s_{n1}[n]$, $s_{n2}[n]$, . . . $s_{nR}[n]$. The codec system of FIG. 3 includes a set of gain amplifiers 370. The gain amplifiers 370 include R gain amplifiers, with one gain amplifier for each of the R component signals. For instance, the gain amplifiers 370 can include a gain amplifier for $s_{n1}[n]$, a gain amplifier for $s_{n2}[n]$, a gain amplifier for $s_{nR}[n]$, and gain amplifiers for each component signal for bands between $s_{n2}[n]$ and $s_{nR}[n]$.

The codec system of FIG. 3 includes a voicing estimator 307. The voicing estimator 307 receives the features f[m] 130 as an input. The voicing estimator 307 generates, based on the features f[m] 130, gain parameters 365 for the gain amplifiers 360. The voicing estimator 307 generates, based on the features f[m] 130, gain parameters 375 for the gain amplifiers 370. The gain parameters 365 can be multipliers that the gain amplifiers 360 use to multiply the amplitudes of each of the Q component signals ($s_{h1}[n]$, $s_{h2}[n]$, . . . $s_{hQ}[n]$) of the filtered harmonic excitation signal $s_h[n]$ to generate Q amplified component signals. The gain parameters 365 generated by the voicing estimator 307 can include distinct, different, and/or separate gain parameters for each of the Q component signals ($s_{h1}[n]$, $s_{h2}[n]$, . . . $s_{hQ}[n]$). The gain parameters 365 can be different for different gain amplifiers of the gain amplifiers 360. For example, the gain parameters 365 can include a first set of gain parameters for a first gain amplifier of the gain amplifiers 360, a second set of gain parameters for a second gain amplifier of the gain amplifiers 360, and so on, until a Qth set of gain parameters for a Qth gain amplifier of the gain amplifier 360.

The gain parameters 375 can be multipliers that the gain amplifiers 370 use to multiply the amplitudes of each of the R component signals ($s_{n1}[n]$, $s_{n2}[n]$, . . . $s_{nR}[n]$) of the filtered noise excitation signal $s_n[n]$ to generate R amplified component signals. The gain parameters 375 generated by the voicing estimator 307 can include distinct, different, and/or separate gain parameters for each of the R component signals ($s_{n1}[n]$, $s_{n2}[n]$, . . . $s_{nR}[n]$). The gain parameters 375 can be different for different gain amplifiers of the gain amplifiers 370. For example, the gain parameters 375 can include a first set of gain parameters for a first gain amplifier of the gain amplifiers 370, a second set of gain parameters for a second gain amplifier of the gain amplifiers 370, and so on, until a Rth set of gain parameters for a Rth gain amplifier of the gain amplifier 370.

The gain parameters 365 and/or the gain parameters 375 can be referred to as gains, as gain multipliers, as gain values, as multipliers, as multiplier values, as gain multiplier values, or a combination thereof. The gain parameters 365 corresponding to the Q component signals ($s_{h1}[n]$, $s_{h2}[n]$, . . . $s_{hQ}[n]$) can be referred to as the Q gain parameters 365 ($a_1[n]$, $a_2[n]$, . . . $a_Q[n]$). The gain parameters 375 corresponding to the R component signals ($s_{n1}[n]$, $s_{n2}[n]$, . . . $s_{nR}[n]$) can be referred to as the R gain parameters 375 ($b_1[n]$, $b_2[n]$, . . . $b_R[n]$). In some examples, Q=R. In examples where Q=R, then for any band i, $a_i[n]$ and $b_i[n]$ can be any real numbers such that $a_i[n]\geq 0$, $b_i[n]\geq 0$, and $a_i[n]+b_i[n]=1$.

The voicing estimator 307 may include, and may generate the gain parameters 365 and/or the gain parameters 375 using, one or more ML systems, one or more ML models, or a combination thereof. In some examples, the voicing estimator 307, and/or the one or more trained ML models of the voicing estimator 307, can include, for example, one or more neural network (NNs) (e.g., neural network 800), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The codec system of FIG. 3 includes a synthesis filterbank 380. The synthesis filterbank 380 combines the Q amplified component signals amplified by the gain amplifiers 360 into a combined signal with a frequency band matching (or similar to) the frequency band of the harmonic excitation signal h[n] 215. The synthesis filterbank 380 outputs the combined signal, which may be referred to as an amplified harmonic excitation signal $s_h'[n]$. In some cases, the application of the analysis filterbank 350, the gain amplifiers 360, and/or the synthesis filterbank 380 to the harmonic excitation signal h[n] 215 can be referred to as a gain stage 395H of the decoding process.

The codec system of FIG. 3 includes a synthesis filterbank 385. The synthesis filterbank 385 combines the R amplified component signals amplified by the gain amplifiers 370 into a combined signal with a frequency band matching (or similar to) the frequency band of the noise excitation signal u[n] 225. The synthesis filterbank 385 outputs the combined signal, which may be referred to as an amplified noise excitation signal $s_n'[n]$. In some cases, the application of the analysis filterbank 355, the gain amplifiers 370, and/or the synthesis filterbank 385 to the noise excitation signal u[n] 225 can be referred to as a gain stage 395N of the decoding process.

The codec system of FIG. 3 includes the adder 260. The adder 260 combines the amplified harmonic excitation signal $s_h'[n]$ output by the synthesis filterbank 380 and the amplified noise excitation signal $s_n'[n]$ output by the synthesis filterbank 385 into a combined audio signal, for instance by summing, adding, and/or otherwise combining the signals. The codec system of FIG. 3 includes the linear filter 265. The linear filter 265 can be time-varying or time-invariant. The linear filter 265 receives the combined audio signal as an input. The linear filter 265 generates the output audio signal $\hat{s}[n]$ 150 by filtering the combined audio signal. The linear filter 265 can be referred to as a post-filter. In some examples, the linear filter 265 is a linear predictive coding (LPC) filter. The output audio signal $\hat{s}[n]$ 150 of FIG. 3 may be different from the output audio signal $\hat{s}[n]$ 150 of FIG. 2 due to the multi-band filtering and multi-band gain of the codec system of FIG. 3.

In some examples, the gain stage 395H and/or the gain stage 395N provide fine-grained sub-band voicing control. In some examples, the gain stage 395H and/or the gain stage 395N provide fine-tuned noise and harmonic mixing to alleviate overvoicing. In some examples, the gain stage 395H and/or the gain stage 395N allows fine-grain sub-band voicing control, for instance by having a large number of bands in the gain stage 395H and/or the gain stage 395N, while keeping number of bands in the filter stage 390H and/or the filter stage 390N relatively low to keep the complexity of the ML filter estimator 305 relatively low. A large number of bands is less of a complexity concern for the voicing estimator 307 because the voicing estimator 307 may, in some cases, only output a single value (gain) per band, while filter parameters per band may be more complex.

The signal path of the harmonic excitation signal p[n] 215 from generation at the harmonic excitation generator 210 to output of the amplified harmonic excitation signal $s_h'[n]$ from the synthesis filterbank 380 to the adder 260 may be referred to as the harmonic signal path of the codec system of FIG. 3. The signal path of the noise excitation signal u[n] 225 from generation at the noise generator 220 to output of the amplified noise excitation signal $s_n'[n]$ from the synthesis filterbank 385 to the adder 260 may be referred to as the noise signal path of the codec system of FIG. 3.

The four analysis filterbanks of the codec system of FIG. 3 include the analysis filterbank 310 on the filter stage 390H of the harmonic signal path, the analysis filterbank 350 on the gain stage 395H of the harmonic signal path, the analysis filterbank 315 on the filter stage 390N of the noise signal path, and the analysis filterbank 355 on the gain stage 395N of the noise signal path.

Any two of the four analysis filterbanks may have the same or different numbers of bands. For instance, any two of J, K, Q, and R may be equal or different compared to one another. Any two of the four analysis filterbanks may have the same or different widths of bands. Any of the four analysis filterbanks may have its bands be uniformly distributed. Any of the four analysis filterbanks may have its bands be non-uniformly distributed.

Figure 4:
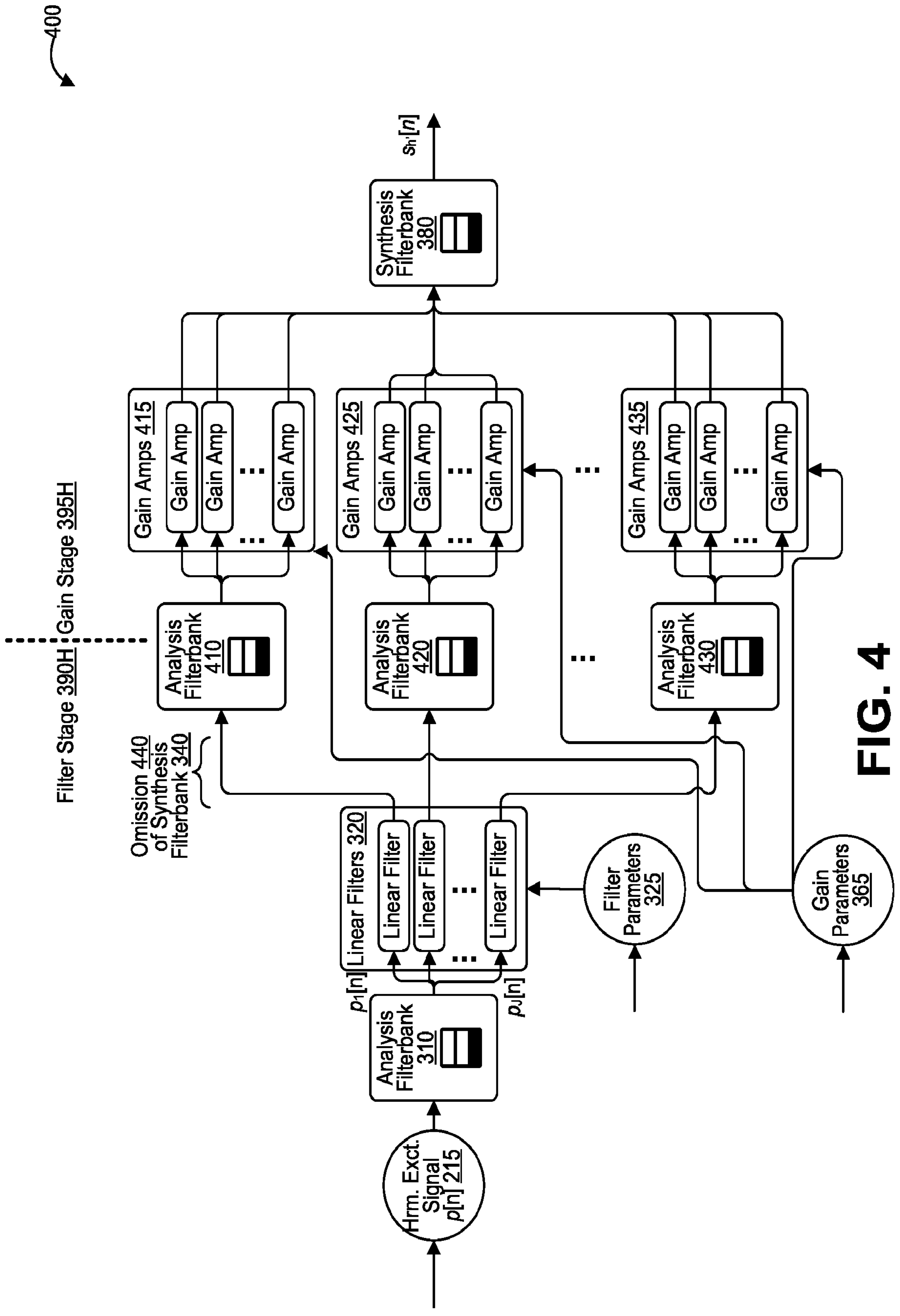
FIG. 4 is a block diagram illustrating an example of a portion of a codec system with an omission of the synthesis filterbank of the filter stage, in accordance with some examples.

FIG. 4 is a block diagram 400 illustrating an example of a portion of a codec system with an omission 440 of the synthesis filterbank 340 of the filter stage 390H. The codec system of FIG. 4 can be an example of at least a portion of the decoder system 140 and/or at least a portion of the decoder 145. The omission 440 of the synthesis filterbank 340 from the codec system of FIG. 4 relative to the codec system of FIG. 3 means that each of the J filtered component signals output by the linear filters 320 is output to a respective analysis filterbank for further division into further sub-bands.

For instance, the codec system of FIG. 4 applies a first filter of the linear filters 320 to the first component signal $p_1[n]$ according to a first set of filter parameters of the filter parameters 325 to produce a first filtered signal. The first filtered signal is received by a first analysis filterbank 410, and is divided into multiple sub-band signals. A first set of gain amplifiers 415 receives the multiple sub-band signals from the first analysis filterbank 410, and amplifies the multiple sub-band signals according to at least a first subset of the gain parameters 365 to produce amplified sub-band signals that are sent to the synthesis filterbank 380.

Similarly, the codec system of FIG. 4 applies a second filter of the linear filters 320 to the second component signal $p_2[n]$ according to a second set of filter parameters of the filter parameters 325 to produce a second filtered signal. The second filtered signal is received by a second analysis filterbank 420, and is divided into multiple sub-band signals. A second set of gain amplifiers 425 receives the multiple sub-band signals from the second analysis filterbank 420, and amplifies the multiple sub-band signals according to at least a second subset of the gain parameters 365 to produce amplified sub-band signals that are sent to the synthesis filterbank 380.

Similarly, the codec system of FIG. 4 applies a Jth filter of the linear filters 320 to the Jth component signal $p_J[n]$ according to a Jth set of filter parameters of the filter parameters 325 to produce a Jth filtered signal. The Jth filtered signal is received by a Jth analysis filterbank 430, and is divided into multiple sub-band signals. A Jth set of gain amplifiers 435 receives the multiple sub-band signals from the Jth analysis filterbank 430, and amplifies the multiple sub-band signals according to at least a Jth subset of the gain parameters 365 to produce amplified sub-band signals that are sent to the synthesis filterbank 380.

The synthesis filterbank 380 combines all of the amplified sub-band signals from the first set of gain amplifiers 415, the second set of gain amplifiers 425, the Jth set of gain amplifiers 435, and any other sets of gain amplifiers in between into the amplified harmonic excitation signal $s_h'[n]$. The amplified harmonic excitation signal $s_h'[n]$ of the codec system of FIG. 4 may be different from the amplified harmonic excitation signal $s_n'[n]$ of FIG. 3.

Only the harmonic signal path of the codec system is illustrated in FIG. 4. It should be understood that a similar omission of the synthesis filterbank 345 may be performed along the noise signal path of the codec system of FIG. 3, between the analysis filterbank 315 and the synthesis filterbank 385. Each of the filtered component noise signals output by the linear filters 330 may be fed to a corresponding analysis filterbank (e.g., similar to the analysis filterbank 410, the analysis filterbank 420, or the analysis filterbank 430), which may output multiple sub-band signals fed to a corresponding set of gain amplifiers (e.g., similar to the gain amplifiers 415, the gain amplifiers 425, or the gain amplifiers 435), which may amplify the multiple sub-band signals according to the gain parameters 375 and output the amplified sub-band signals to the synthesis filterbank 385.

Figure 5:
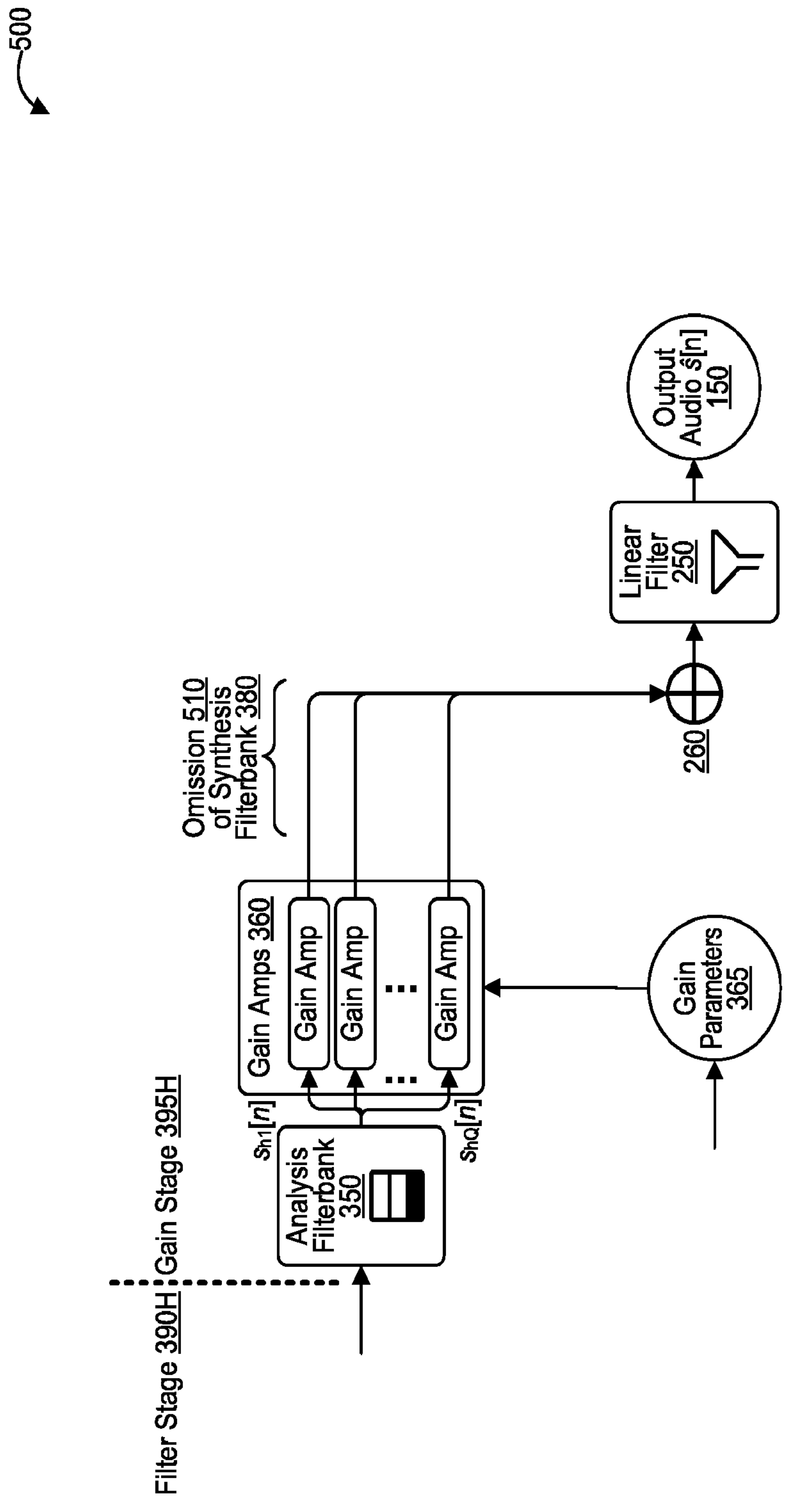
FIG. 5 is a block diagram illustrating an example of a portion of a codec system with an omission of the synthesis filterbank of the gain stage, in accordance with some examples.

FIG. 5 is a block diagram 500 illustrating an example of a portion of a codec system with an omission 510 of the synthesis filterbank 380 of the gain stage 395H. The codec system of FIG. 5 can be an example of at least a portion of the decoder system 140 and/or at least a portion of the decoder 145. The omission 510 of the synthesis filterbank 380 can mean that the Q amplified component signals output by the gain amplifiers 360 in response to amplification of the Q component signals ($s_{h1}[n]$, $s_{h2}[n]$, . . . $s_{hQ}[n]$) by the gain amplifiers 360 according to the gain parameters 365 go directly to the adder 260.

In some cases, filterbanks may be oversampled or critically sampled. In the case of oversampled filterbanks without any downsampling, an analysis filterbank or synthesis filterbank may be mathematically trivial (e.g., containing unit impulse filters) and therefore may function as a pass-through and/or may be omitted in some implementations of the codec system, as in the omission 510 of the synthesis filterbank 380.

While the codec system of FIG. 5 illustrates the omission 510 of the synthesis filterbank 380 from the gain stage 395H of the harmonic signal path, other filterbanks may similarly be omitted from the codec system of FIG. 3. For instance, one or more filterbanks may be omitted from the codec system of FIG. 3, including the analysis filterbank 310, the analysis filterbank 315, the synthesis filterbank 340, the synthesis filterbank 345, the analysis filterbank 350, the analysis filterbank 355, the synthesis filterbank 380, and/or the synthesis filterbank 385.

Omission of an analysis filterbank (e.g., the analysis filterbank 310, the analysis filterbank 315, the analysis filterbank 350, or the analysis filterbank 355) can be equivalent to an analysis filterbank with a single band that matches, is larger than, or is similar to, the band of the input signal. Omission of an analysis filterbank means that all bands are processed the same way, whether using linear filters (e.g., linear filters 320, linear filters 330) or gain amplifiers (e.g., gain amplifiers 360, gain amplifiers 370). In some examples, up to three of the analysis filterbanks can be removed from the codec system of FIG. 3, as long as at least one analysis filterbank remains.

Figure 6:
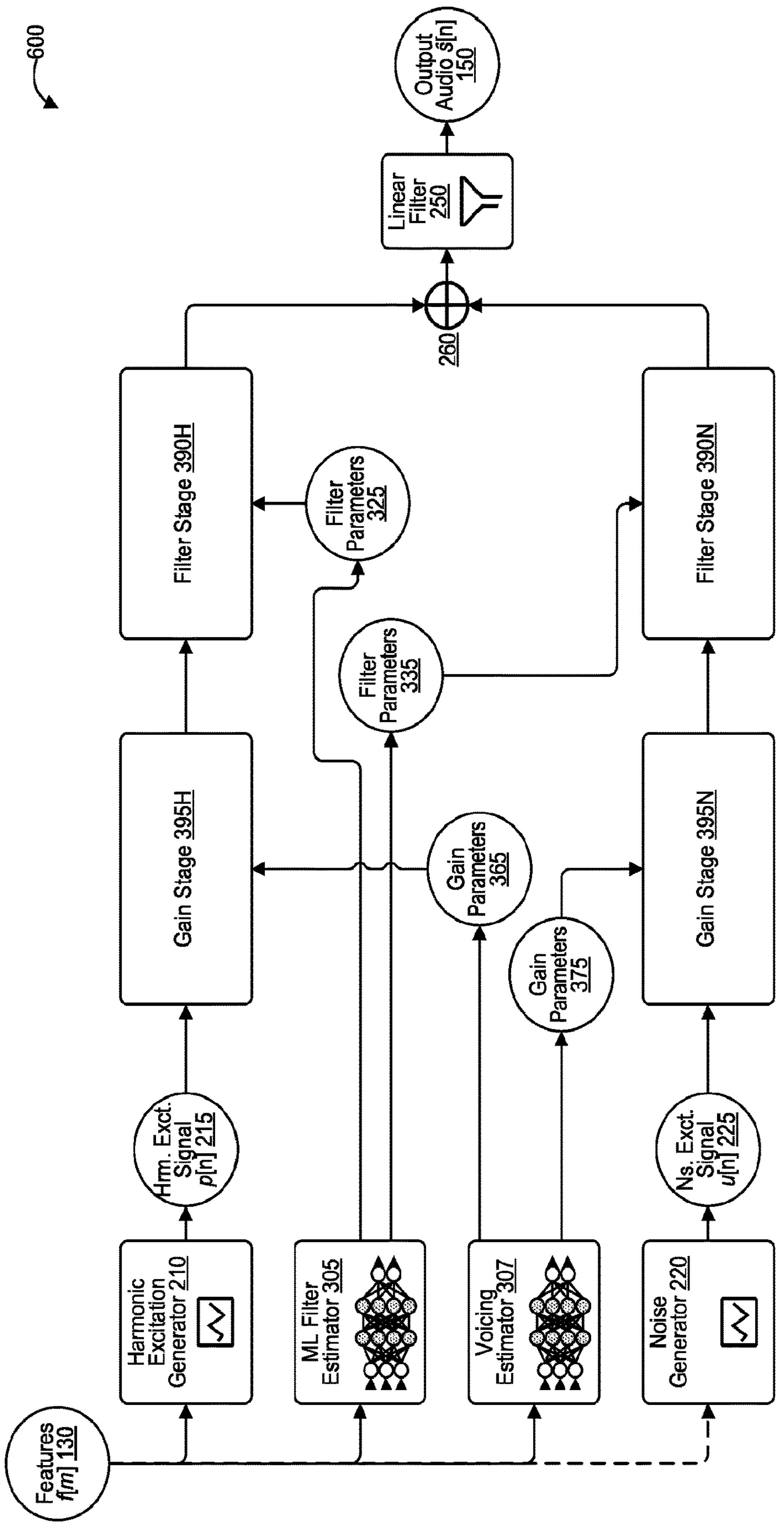
FIG. 6 is a block diagram illustrating an example of a codec system in which the gain stage precedes the filter stage for processing the harmonic excitation signal, and in which the gain stage precedes the filter stage for processing the noise excitation signal, in accordance with some examples.

FIG. 6 is a block diagram 600 illustrating an example of a codec system in which the gain stage 395H precedes the filter stage 390H for processing the harmonic excitation signal 215, and in which the gain stage 395N precedes the filter stage 390N for processing the noise excitation signal 225. The codec system of FIG. 6 can be an example of at least a portion of the decoder system 140 and/or at least a portion of the decoder 145. Various components of the codec system of FIG. 3 can commute, meaning that the result may be mathematically the same when certain operations are performed in different order and/or transposed. This extends to the entire stages along the two filter paths. For instance, along the harmonic signal path, the filter stage 390H and the gain stage 395H may commute as illustrated in FIG. 6, where the gain stage 395H is before the filter stage 390H (the reverse of the order illustrated in FIG. 3). Similarly, along the noise signal path, the filter stage 390N and the gain stage 395N may commute as illustrated in FIG. 6, where the gain stage 395N is before the filter stage 390N (the reverse of the order illustrated in FIG. 3).

In some examples, a codec system may include a mix of the orders of FIG. 3 and FIG. 6.

For instance, the codec system may have its filter stage 390H before its gain stage 395H along the harmonic signal path, but its gain stage 390N before its filter stage 390N along its noise signal path. Similarly, the codec system may have its gain stage 395H before its filter stage 390H along the harmonic signal path, but its filter stage 390N before its gain stage 390N along its noise signal path.

Figure 7A:
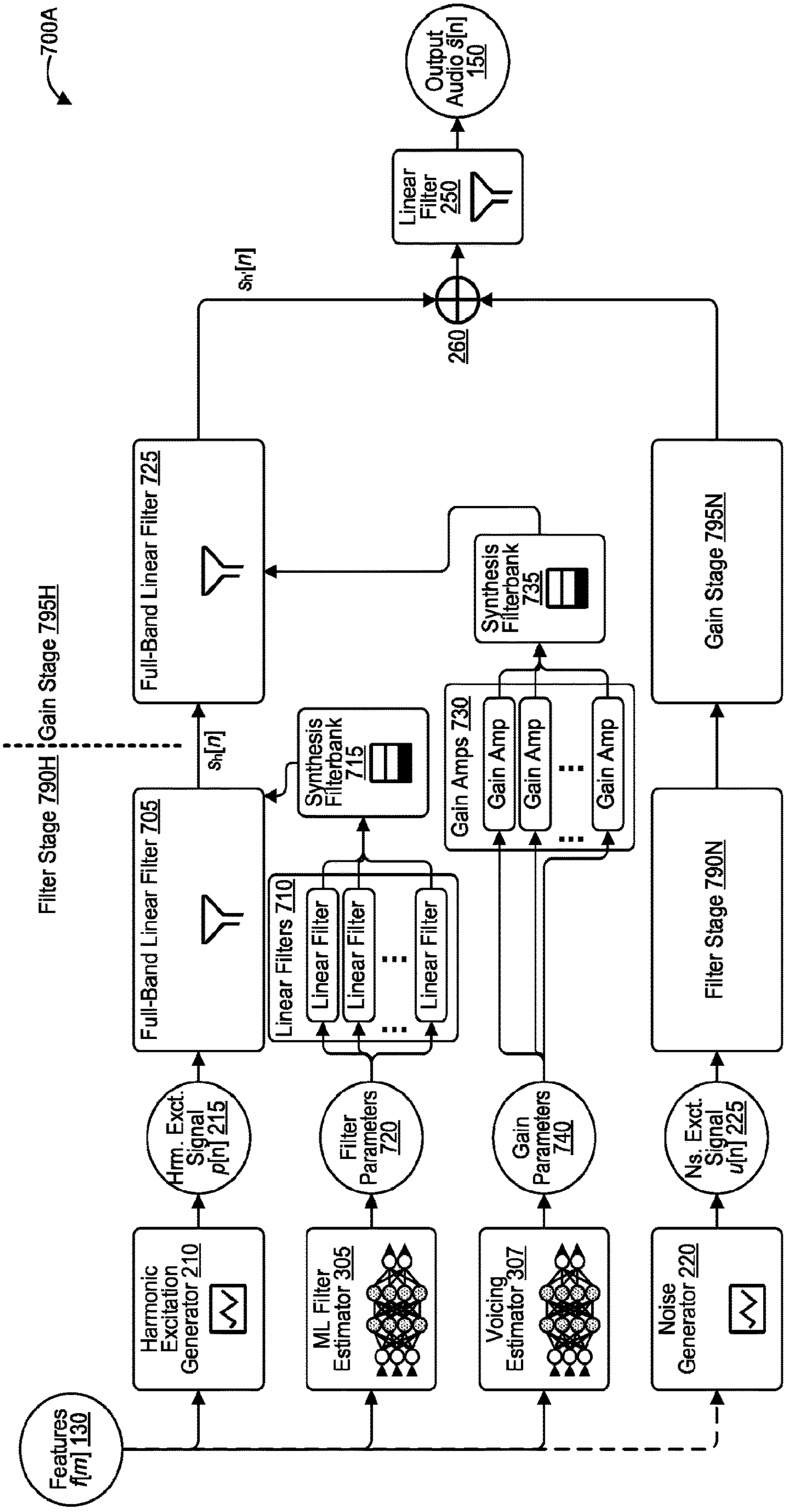
FIG. 7A is a block diagram illustrating an example of a codec system that applies a full-band linear filter for filtering and a full-band linear filter for gain to the harmonic excitation signal, in accordance with some examples.

FIG. 7A is a block diagram 700A illustrating an example of a codec system that applies a full-band linear filter 705 for filtering and a full-band linear filter 725 for gain to the harmonic excitation signal 215. The codec system of FIG. 7A can be an example of at least a portion of the decoder system 140 and/or at least a portion of the decoder 145. A harmonic signal path of the codec system is illustrated in FIG. 7A.

In the codec system of FIG. 7A, the ML filter estimator 305 may generate the filter parameters 720 (e.g., filter parameters 325) for the various bands of the linear filters 710 (e.g., the J bands of the analysis filterbank 310 and/or the linear filters 320). The codec system of FIG. 7A can combine the linear filters 710, with the filter parameters 720 incorporated therein, into a full-band linear filter 705 using a synthesis filterbank 715. The codec system of FIG. 7A can perform the filter stage 790H by applying the full-band linear filter 705 to the harmonic excitation signal 215, generating a filtered harmonic excitation signal $s_h[n]$.

In the codec system of FIG. 7A, the voicing estimator 307 may generate the gain parameters 740 (e.g., gain parameters 365) for the various bands of the gain amplifiers 730 (e.g., the Q bands of the analysis filterbank 350 and/or the gain amplifiers 360). The codec system of FIG. 7A can combine the gain amplifiers 730, with the gain parameters 740 incorporated therein, into a full-band linear filter 725 using a synthesis filterbank 735. The codec system of FIG. 7A can perform the gain stage 795H by applying the full-band linear filter 725 to the filtered harmonic excitation signal $s_h[n]$ to generate an amplified harmonic excitation signal $s_h'[n]$.

The coded system of FIG. 7A also includes the noise signal path, with the noise generator 220 generating the noise excitation signal u[n] 225 and modifying the noise excitation signal u[n] 225 using the filter stage 790N and/or the gain stage 795N. The filter stage 790N of FIG. 7A can match the filter stage 390N of any of FIGS. 3-6, or the filter stage 790N of FIG. 7A can match the filter stage 790N of FIG. 7B. The gain stage 795N of FIG. 7A can match the gain stage 395N of any of FIGS. 3-6, or the gain stage 795N of FIG. 7A can match the gain stage 795N of FIG. 7B. The dashed line from the feature(s) f[m] 130 to the noise generator 220 indicates that the noise generator 220 can either receive the feature(s) f[m] 130 or not receive the feature(s) f[m] 130. The noise generator 220 can generate the noise excitation signal u[n] 225 either based on the feature(s) f[m] 130 or without any basis on the feature(s) f[m] 130.

Figure 7B:
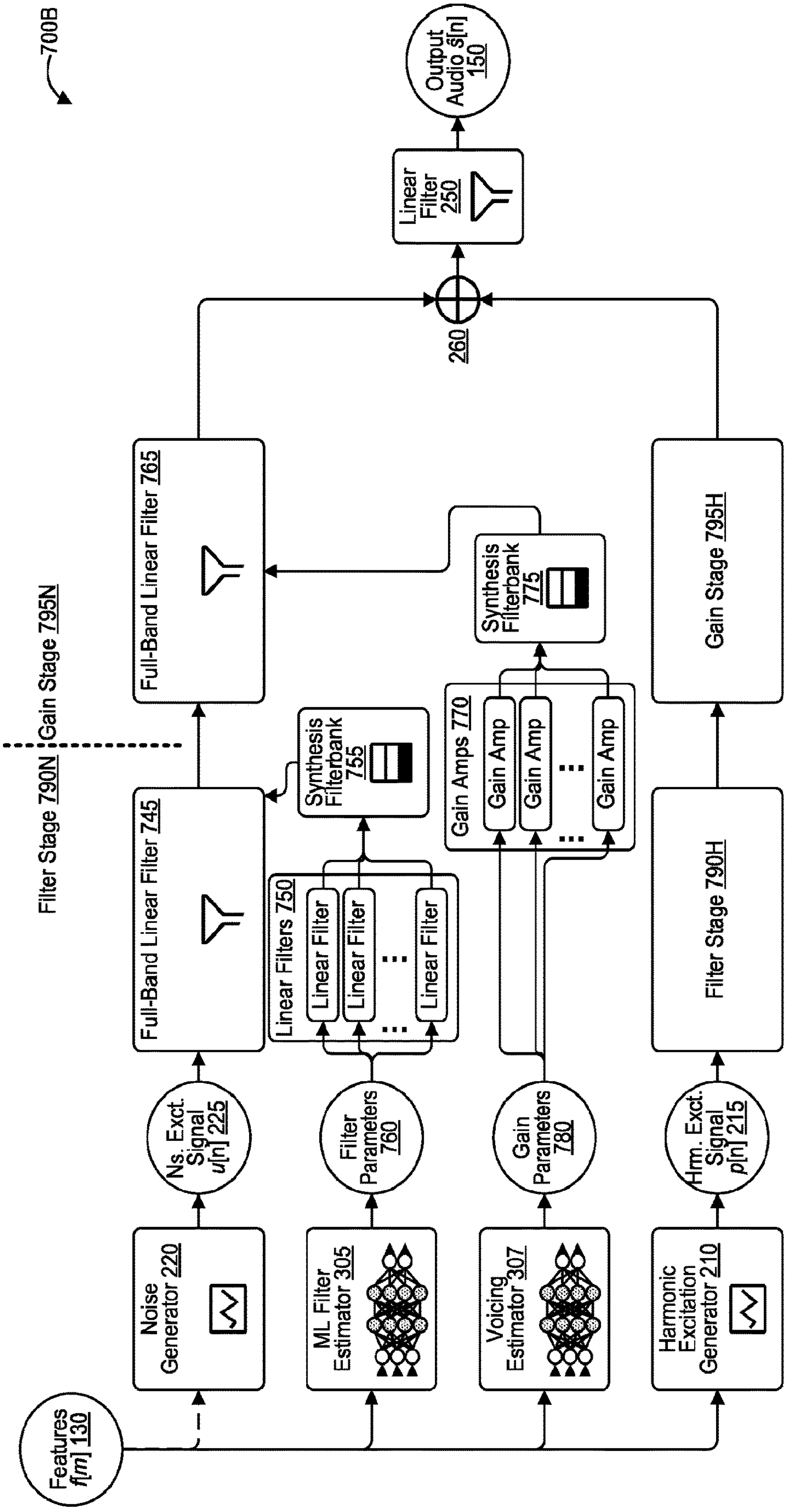
FIG. 7B is a block diagram illustrating an example of a codec system that applies a full-band linear filter for filtering and a full-band linear filter for gain to the noise excitation signal, in accordance with some examples.

FIG. 7B is a block diagram 700B illustrating an example of a codec system that applies a full-band linear filter 745 for filtering and a full-band linear filter 765 for gain to the noise excitation signal 225. The codec system of FIG. 7B can be an example of at least a portion of the decoder system 140 and/or at least a portion of the decoder 145. A noise signal path of the codec system is illustrated in FIG. 7B. The dashed line from the feature(s) f[m] 130 to the noise generator 220 indicates that the noise generator 220 can either receive the feature(s) f[m] 130 or not receive the feature(s) f[m] 130. The noise generator 220 can generate the noise excitation signal u[n] 225 either based on the feature(s) f[m] 130 or without any basis on the feature(s) f[m] 130.

In the codec system of FIG. 7B, the ML filter estimator 305 may generate the filter parameters 760 (e.g., filter parameters 335) for the various bands of the linear filters 750 (e.g., the K bands of the analysis filterbank 315 and/or the linear filters 330). The codec system of FIG. 7B can combine the linear filters 750, with the filter parameters 760 incorporated therein, into a full-band linear filter 745 using a synthesis filterbank 755. The codec system of FIG. 7B can perform the filter stage 790N by applying the full-band linear filter 745 to the noise excitation signal 225, generating a filtered noise excitation signal $s_n[n]$.

In the codec system of FIG. 7B, the voicing estimator 307 may generate the gain parameters 780 (e.g., gain parameters 375) for the various bands of the gain amplifiers 770 (e.g., the R bands of the analysis filterbank 355 and/or the gain amplifiers 370). The codec system of FIG. 7B can combine the gain amplifiers 770, with the gain parameters 780 incorporated therein, into a full-band linear filter 765 using a synthesis filterbank 775. The codec system of FIG. 7B can perform the gain stage 795H by applying the full-band linear filter 765 to the filtered noise excitation signal $s_n[n]$ to generate an amplified noise excitation signal $s_n'[n]$.

The coded system of FIG. 7B also includes the harmonic signal path, with the harmonic excitation generator 210 generating the harmonic excitation signal p[n] 215 and modifying the harmonic excitation signal p[n] 215 using the filter stage 790H and/or the gain stage 795H. The filter stage 790H of FIG. 7B can match the filter stage 390H of any of FIGS. 3-6, or the filter stage 790H of FIG. 7B can match the filter stage 790H of FIG. 7A. The gain stage 795H of FIG. 7B can match the gain stage 395H of any of FIGS. 3-6, or the gain stage 795H of FIG. 7B can match the gain stage 795H of FIG. 7A.

There is no loss of flexibility in the filter estimation by the ML filter estimator 305, or in voicing estimation by the voicing estimator 307, between the codec system of FIG. 3 and the codec systems of FIGS. 7A-7B. The codec system of FIG. 3 and the codec systems of FIGS. 7A-7B yield the same or similar quality of the output audio signal ŝ[n] 150. The output audio signal ŝ[n] 150 of FIG. 3 may be different than the output audio signal ŝ[n] 150 of FIGS. 7A-7B. The output audio signal ŝ[n] 150 of FIG. 3 may be the same than the output audio signal ŝ[n] 150 of FIGS. 7A-7B.

In some examples, a codec system may include a mix of the stage setups of FIG. 3 and FIGS. 7A-7B. For instance, the codec system may use the filter stage 390H of FIG. 3 and the gain stage 395H of FIG. 7A. Similarly, the codec system may use the filter stage 390H of FIG. 7A and the gain stage 395H of FIG. 3. The codec system may use the filter stage 390N of FIG. 3 and the gain stage 395N of FIG. 7B. Similarly, the codec system may use the filter stage 390N of FIG. 7B and the gain stage 395N of FIG. 3.

In some examples, a codec system may include a mix of modifications to the codec system of FIG. 3 as described with respect to FIGS. 4, 5, 6, 7A, and/or 7B. For example, a codec system may include a mix of the filterbank omission(s) 440 described in FIG. 4, the filterbank omission(s) 510 described in FIG. 5, the rearranging of the gain and filter stages of FIG. 6, the modifier gain and/or filter stages of FIGS. 7A-7B, or combinations thereof.

Figure 8:
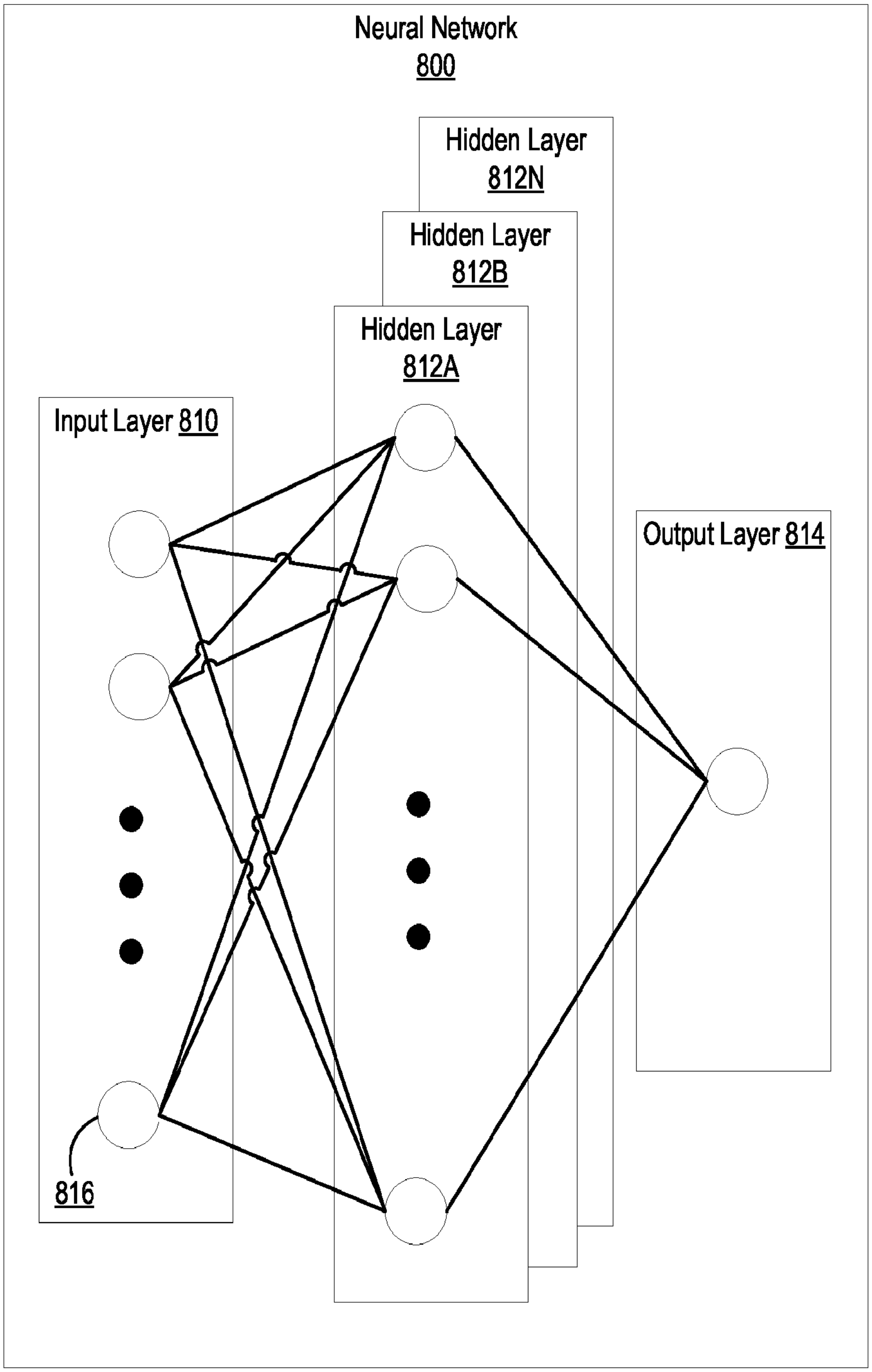
FIG. 8 is a block diagram illustrating an example of a neural network that can be used by the machine learning (ML) filter estimator to generate filter parameters and/or by the voicing estimator to generate gain parameters, in accordance with some examples.

FIG. 8 is a block diagram illustrating an example of a neural network (NN) 800 that can be used by the machine learning (ML) filter estimator (e.g., ML filter estimator 205, ML filter estimator 305) to generate filter parameters and/or by the voicing estimator 307 to generate gain parameters. According to an illustrative example, the NN 800 can be used by the ML filter estimator 205 to generate the filter parameters 235 and/or the filter parameters 245 based on the features f[m] 130. According to another illustrative example, the NN 800 can be used by the ML filter estimator 305 to generate the filter parameters 325, the filter parameters 335, the filter parameters 720, and/or the filter parameters 760 based on the features f[m] 130. According to another illustrative example, the NN 800 can be used by the voicing estimator 307 to generate the gain parameters 365, the gain parameters 375, the gain parameters 740, and/or the gain parameters 780 based on the features f[m] 130.

The neural network 800 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 800 may be an example of at least a portion of the ML filter estimator 205, the ML filter estimator 305, the voicing estimator 307, or a combination thereof.

An input layer 810 of the neural network 800 includes input data. The input data of the input layer 810 can include data representing the feature(s) corresponding to an audio signal. In some examples, the input data of the input layer

810 includes data representing the feature(s) f[m] 130. In some examples, the input data of the input layer 810 includes data representing an audio signal, such as the audio signal s[n] 105. In some examples, the input data of the input layer 810 includes data representing media data, such as the media data m[n] 120. In some examples, the input data of the input layer 810 includes metadata associated with an audio signal (e.g., the audio signal s[n] 105), with media data (e.g., the media data m[n] 120), and/or with features (e.g., the feature(s) f[m]).

The neural network 800 includes multiple hidden layers 812A, 812B, through 812N. The hidden layers 812A, 812B, through 812N include "N" number of hidden layers, where "N" is an integer greater than or equal to one. The number of hidden layers can be made to include as many layers as needed for the given application. The neural network 800 further includes an output layer 814 that provides an output resulting from the processing performed by the hidden layers 812A, 812B, through 812N. In some examples, the output layer 814 can provide parameters to tune application of one or more audio signal processing components of a codec system. In some examples, the output layer 814 provides one or more filter parameters for one or more linear filters, such as the filter parameters 325, the filter parameters 335, the filter parameters 720, and/or the filter parameters 760. In some examples, the output layer 814 provides one or more gain parameters for one or more gain amplifiers, such as the gain parameters 365, the gain parameters 375, the gain parameters 740, and/or the gain parameters 780.

The neural network 800 is a multi-layer neural network of interconnected filters. Each filter can be trained to learn a feature representative of the input data. Information associated with the filters is shared among the different layers and each layer retains information as information is processed. In some cases, the neural network 800 can include a feed-forward network, in which case there are no feedback connections where outputs of the network are fed back into itself. In some cases, the network 800 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 810 can activate a set of nodes in the first hidden layer 812A. For example, as shown, each of the input nodes of the input layer 810 can be connected to each of the nodes of the first hidden layer 812A. The nodes of a hidden layer can transform the information of each input node by applying activation functions (e.g., filters) to this information. The information derived from the transformation can then be passed to and can activate the nodes of the next hidden layer 812B, which can perform their own designated functions. Example functions include convolutional functions, downscaling, upscaling, data transformation, and/or any other suitable functions. The output of the hidden layer 812B can then activate nodes of the next hidden layer, and so on. The output of the last hidden layer 812N can activate one or more nodes of the output layer 814, which provides a processed output image. In some cases, while nodes (e.g., node 816) in the neural network 800 are shown as having multiple output lines, a node has a single output and all lines shown as being output from a node represent the same output value.

In some cases, each node or interconnection between nodes can have a weight that is a set of parameters derived from the training of the neural network 800. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 810 using the different hidden layers 812A, 812B, through 812N in order to provide the output through the output layer 814.

Figure 9:
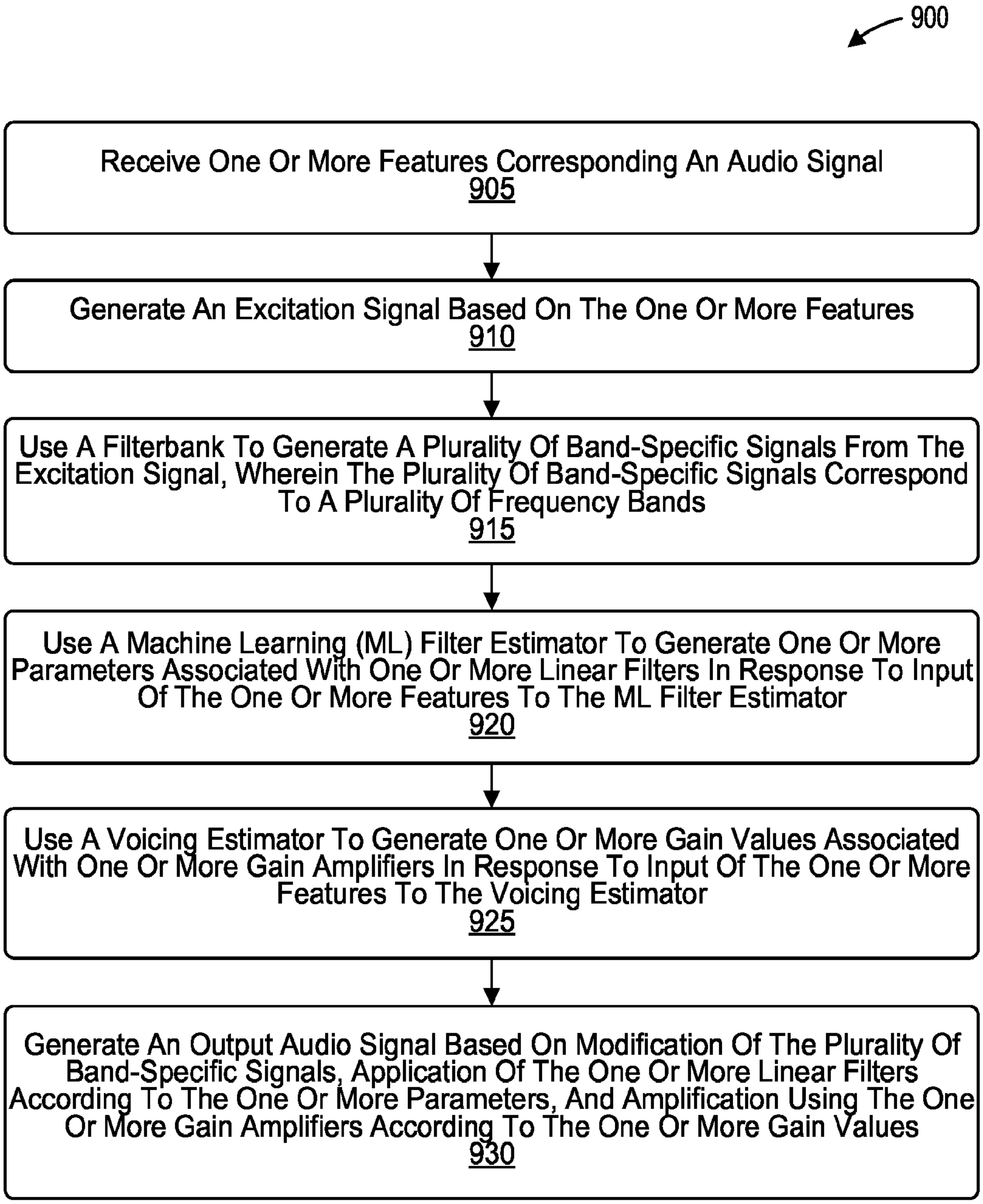
FIG. 9 is a flow diagram illustrating a process for audio coding, in accordance with some examples.

FIG. 9 is a flow diagram illustrating a process 900 for audio coding. The process 900 may be performed by a codec system. In some examples, the codec system can include, for example, the codec system of FIG. 1, the encoder system 110, the encoder 115, the speech synthesis system 125, the decoder system 140, the decoder 145, the codec system of FIG. 2, the codec system of FIG. 3, the codec system of FIG. 4, the codec system of FIG. 5, the codec system of FIG. 6, the codec system of FIG. 7A, the codec system of FIG. 7B, the neural network 800, the computing system 1000, the processor 1010, one or more components discussed herein of any of the previously-listed systems, one or more portions of any of the previously-listed systems, or a combination thereof.

At operation 905, the codec system is configured to, and can, receive one or more features corresponding an audio signal. Examples of the one or more features include the feature(s) f[m] 130. Examples of the audio signal that the one or more features correspond to include the audio signal s[n] 105, the media data m[n] 120, and/or an audio signal corresponding to the media data m[n] 120 and/or generated by the speech synthesis system 125.

In some aspects, receiving the one or more features includes receiving the one or more features from an encoder that is configured to generate the one or more features at least in part by encoding the audio signal. In some aspects, receiving the one or more features includes receiving the one or more features from a speech synthesizer configured to generate the one or more features at least in part based on a text input, in which case the audio signal may be an audio representation of a voice reading the text input. In some cases, when computing the one or more features from the text input (e.g., when the one or more features are received from the speech synthesizer), the codec system may not receive or process an accompanying audio signal that is generated from the text. For instance, the codec system may use (e.g., my only use) part of the speech synthesis system that corresponds to the process of mapping text to features, in which case no audio signal is used as input when computing the one or more features in cases where text is used as input. In such cases, the audio representation of the text may be generated at the final output as the output audio signal 150.

In some aspects, the one or more features include one or more log-mel-frequency spectrum features.

At operation 910, the codec system is configured to, and can, generate an excitation signal based on the one or more features. Examples of the excitation signal include the harmonic excitation signal p[n] 215, the noise excitation signal u[n] 225, another excitation signal described herein, or a combination thereof. The excitation signal can be generated based on the one or more features using the decoder system 140, the decoder 145, the harmonic excitation generator 210, the noise generator 220, or a combination thereof.

In some aspects, the excitation signal is a harmonic excitation signal corresponding to a harmonic component of the audio signal. Examples of the harmonic excitation signal include the harmonic excitation signal p[n] 215. In some aspects, the excitation signal is a noise excitation signal corresponding to a noise component of the audio signal. Examples of the noise excitation signal include the noise excitation signal u[n] 225.

At operation 915, the codec system is configured to, and can, use a filterbank to generate a plurality of band-specific signals from the excitation signal. The plurality of band-specific signals correspond to a plurality of frequency bands. Examples of the filterbank include the analysis filterbank 310, the analysis filterbank 315, the analysis filterbank 350, the analysis filterbank 355, the analysis filterbank 410, the analysis filterbank 420, the analysis filterbank 430, an analysis filterbank that breaks of the linear filters 710 of FIG. 7A into multiple bands (not pictured), an analysis filterbank that breaks of the gain amplifiers 730 of FIG. 7A into multiple bands (not pictured), an analysis filterbank that breaks of the linear filters 750 of FIG. 7B into multiple bands (not pictured), an analysis filterbank that breaks of the gain amplifiers 770 of FIG. 7B into multiple bands (not pictured), another filterbank described herein, or a combination thereof. Examples of the plurality of band-specific signals corresponding to the plurality of frequency bands can include the band-specific signals $p_{x1}[n]$ for frequency bands x1 ranging from 1 to J (e.g., produced by the analysis filterbank 310), the band-specific signals $u_{x2}[n]$ for frequency bands x2 ranging from 1 to K (e.g., produced by the analysis filterbank 315), the band-specific signals $s_{hx3}[n]$ for frequency bands x3 ranging from 1 to Q (e.g., produced by the analysis filterbank 350), the band-specific signals $s_{nx4}[n]$ for frequency bands x4 ranging from 1 to R (e.g., produced by the analysis filterbank 355), band-specific signals produced by the analysis filterbank 410, band-specific signals produced by the analysis filterbank 420, band-specific signals produced by the analysis filterbank 430, band-specific signals associated with the linear filters 710 of FIG. 7A, band-specific signals associated with the gain amplifiers 730 of FIG. 7A, band-specific signals associated with the linear filters 750 of FIG. 7B, band-specific signals associated with the gain amplifiers 770 of FIG. 7B, other band-specific signals described herein, or a combination thereof.

At operation 920, the codec system is configured to, and can, use a machine learning (ML) filter estimator to generate one or more parameters associated with one or more linear filters in response to input of the one or more features to the ML filter estimator. Examples of the ML filter estimator include the ML filter estimator 205, the ML filter estimator 305, the NN 800, or a combination thereof. Examples of the one or more parameters include the filter parameters 235, the filter parameters 245, the filter parameters 325, the filter parameters 335, the filter parameters 720, the filter parameters 760, other filter parameters described herein, or a combination thereof. Examples of the one or more linear filters include the linear filter 230, the linear filter 240, the linear filter 230, at least one of the linear filters 320, at least one of the linear filters 330, at least one of the linear filters 710, at least one of the linear filters 750, the full-band linear filter 705, the full-band linear filter 725, the full-band linear filter 745, the full-band linear filter 765, another linear filter described herein, or a combination thereof.

In some aspects, the ML filter estimator includes one or more trained ML models. In some aspects, the ML filter estimator includes one or more trained neural networks, such as the NN 800.

In some aspects, the one or more linear filters include one or more time-varying linear filters. In some aspects, the one or more linear filters include one or more time-invariant linear filters.

In some aspects, the one or more parameters associated with one or more linear filters include an impulse response associated with the one or more linear filters. In some aspects, the one or more parameters associated with one or more linear filters include a frequency response associated with the one or more linear filters. In some aspects, the one or more parameters associated with one or more linear filters include a rational transfer function coefficient associated with the one or more linear filters.

At operation 925, the codec system is configured to, and can, use a voicing estimator to generate one or more gain values associated with one or more gain amplifiers in response to input of the one or more features to the voicing estimator. Examples of the voicing estimator include the voicing estimator 307, the NN 800, or a combination thereof. Examples of the one or more gain values include the gain parameters 365, the gain parameters 375, the gain parameters 740, the gain parameters 780, other gain values described herein, or a combination thereof. Examples of the one or more gain amplifiers include the at least one of the gain amplifiers 360, at least one of the gain amplifiers 370, at least one of the gain amplifiers 415, at least one of the gain amplifiers 425, at least one of the gain amplifiers 435, at least one of the gain amplifiers 730, at least one of the gain amplifiers 770, the full-band linear filter 725, the full-band linear filter 765, another gain amplifier described herein, or a combination thereof.

In some aspects, the voicing estimator includes one or more trained NIL models. In some aspects, the voicing estimator includes one or more trained neural networks, such as the NN 800.

At operation 930, the codec system is configured to, and can, generate an output audio signal based on modification of the plurality of band-specific signals, application of the one or more linear filters according to the one or more parameters, and amplification using the one or more gain amplifiers according to the one or more gain values. Examples of the output audio signal include the output audio signal $\hat{s}[n]$ 150.

In some aspects, the audio signal is a speech signal. In some examples, the output audio signal is a reconstructed speech signal that is a reconstructed variant of the speech signal.

In some aspects, generating the output audio signal includes combining the plurality of band-specific signals using a synthesis filterbank. Examples of the synthesis filterbank include the synthesis filterbank adder 260, the synthesis filterbank 340, the synthesis filterbank 345, the synthesis filterbank 380, the synthesis filterbank 385, the synthesis filterbank 715, the synthesis filterbank 735, the synthesis filterbank 755, the synthesis filterbank 775, another synthesis filterbank described herein, or a combination thereof. In some aspects, generating the output audio signal includes modifying the plurality of band-specific signals by applying at least one of the one or more linear filters to each of the plurality of band-specific signals according to the one or more parameters. Examples of this include application of the linear filters 320 according to the filter parameters 325, application of the linear filters 330 according to the filter parameters 335, application of the linear filters 710 and/or the full-band linear filter 705 according to the filter parameters 720, application of the linear filters 750 and/or the full-band linear filter 745 according to the filter parameters 760, or a combination thereof.

In some aspects, to generate the output audio signal, the codec system combines the plurality of band-specific signals into a filtered signal (e.g., using a synthesis filterbank). Examples of the filtered signal include the filtered harmonic signal $s_h[n]$ 250, the filtered noise signal $s_n[n]$ 255, the filtered harmonic signal $s_h[n]$ of any of FIGS. 3-7B, the filtered noise signal $s_n[n]$ of any of FIGS. 3-7B, or a combination thereof. The codec system uses a second filterbank (e.g., the analysis filterbank 350, the analysis filterbank 355) to generate a second plurality of band-specific signals (e.g., $s_{h1}[n]$ through $s_{hQ}[n]$ and/or $s_{n1}[n]$ through $s_{nR}[n]$) from the filtered signal. The second plurality of band-specific signals correspond to a second plurality of frequency bands. The codec system modifies the second plurality of band-specific signals by applying at least one of the one or more gain amplifiers (e.g., the gain amplifiers 360, the gain amplifiers 370, the gain amplifiers 730, the full-band linear filter 725, the gain amplifiers 770, the full-band linear filter 765) to each of the second plurality of band-specific signals according to the one or more gain values. The codec system combines the second plurality of band-specific signals (e.g., via the synthesis filterbank 380, the synthesis filterbank 385, and/or the adder 260). In some aspects, generating the output audio signal includes combining the plurality of band-specific signals into a filtered signal and modifying the filtered signal by applying the one or more gain amplifiers to the filtered signal according to the one or more gain values.

In some aspects, generating the output audio signal includes modifying the plurality of band-specific signals by applying at least one of the one or more gain amplifiers to each of the plurality of band-specific signals according to the one or more gain values. Examples of this include application of the gain amplifiers 360 according to the gain parameters 365, application of the gain amplifiers 370 according to the gain parameters 375, application of the gain amplifiers 730 and/or the full-band linear filter 725 according to the gain parameters 740, application of the gain amplifiers 770 and/or the full-band linear filter 765 according to the gain parameters 780, or a combination thereof.

In some aspects, to generate the output audio signal, the codec system combines the plurality of band-specific signals into an amplified signal (e.g., generated by the gain stage 395H of FIG. 6 and/or the gain stage 395N of FIG. 6). The codec system uses a second filterbank (e.g., of the filter stage 390H of FIG. 6 and/or the filter stage 390N of FIG. 6) to generate a second plurality of band-specific signals from the amplified signal. The second plurality of band-specific signals correspond to a second plurality of frequency bands. The codec system modifies the second plurality of band-specific signals by applying at least one of the one or more gain amplifiers to each of the second plurality of band-specific signals according to the one or more gain values. The codec system combines the second plurality of band-specific signals. In some aspects, generating the output audio signal includes combining the plurality of band-specific signals into an amplified signal and modifying the amplified signal by applying the one or more gain amplifiers to the amplified signal according to the one or more gain values.

In some aspects, the codec system modifies the output audio signal using an additional linear filter. Examples of the additional linear filter include the linear filter 230. In some aspects, the additional linear filter is time-varying. In some aspects, the additional linear filter is time-invariant. In some aspects, the additional linear filter is a linear predictive coding (LPC) filter.

In some aspects, the codec system modifies the excitation signal using an additional linear filter before using the filterbank to generate the plurality of band-specific signals from the excitation signal. Examples of the additional linear filter include the linear filter 230, in cases where the linear filter 230 is moved to one of the signal paths before the adder 260 and before at least one of: the analysis filterbank 310, the analysis filterbank 315, the analysis filterbank 350, the analysis filterbank 355, the analysis filterbank 410, the analysis filterbank 420, the analysis filterbank 430, another filterbank described herein, or a combination thereof. In some aspects, the additional linear filter is time-varying. In some aspects, the additional linear filter is time-invariant. In some aspects, the additional linear filter is a linear predictive coding (LPC) filter.

In some examples, the processes described herein (e.g., the processes of FIG. 1, FIG. 2, FIG. 3, FIG. 4, FIG. 5, FIG. 6, FIG. 7A, FIG. 7B, FIG. 8, FIG. 9, FIG. 10, other process described herein, and/or combinations thereof) may be performed by a computing device or apparatus. In some examples, the processes described herein and listed above herein can be performed by the decoder system 140. In another example, the processes described herein can be performed by a computing device with the computing system 1000 shown in FIG. 10.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes described herein and listed above. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein and listed above are illustrated as logical flow diagrams, block diagrams, and/or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process described herein and listed above may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
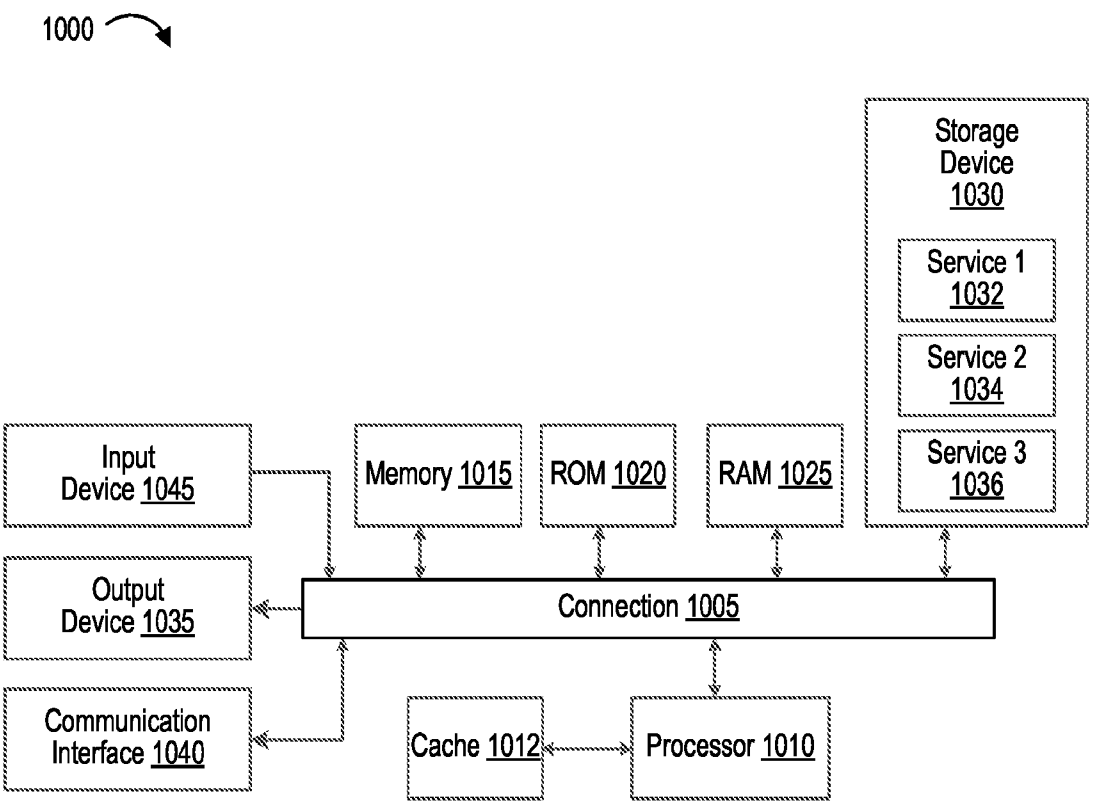
FIG. 10 is a diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communication interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing image data, the apparatus comprising: a memory; and one or more processors coupled to the memory, the one or more processors configured to: receive one or more features corresponding an audio signal; generate an excitation signal based on the one or more features; use a filterbank to generate a plurality of band-specific signals from the excitation signal, wherein the plurality of band-specific signals correspond to a plurality of frequency bands; use a machine learning (MIL) filter estimator to generate one or more parameters associated with one or more linear filters in response to input of the one or more features to the MIL, filter estimator; use a voicing estimator to generate one or more gain values associated with one or more gain amplifiers in response to input of the one or more features to the voicing estimator; and generate an output audio signal based on modification of the plurality of band-specific signals, application of the one or more linear filters according to the one or more parameters, and amplification using the one or more gain amplifiers according to the one or more gain values.

Aspect 2. The apparatus of Aspect 1, wherein the audio signal is a speech signal, and wherein the output audio signal is a reconstructed speech signal that is a reconstructed variant of the speech signal.

Aspect 3. The apparatus of any of Aspects 1 or 2, wherein, to receive the one or more features, the one or more processors are configured to receive the one or more features from an encoder that generates the one or more features at least in part by encoding the audio signal.

Aspect 4. The apparatus of any of Aspects 1 to 3, wherein, to receive the one or more features, the one or more processors are configured to receive the one or more features from a speech synthesizer that generates the one or more features at least in part based on a text input, wherein the audio signal is an audio representation of a voice reading the text input.

Aspect 5. The apparatus of any of Aspects 1 to 4, wherein the excitation signal is a harmonic excitation signal corresponding to a harmonic component of the audio signal.

Aspect 6. The apparatus of any of Aspects 1 to 5, wherein the excitation signal is a noise excitation signal corresponding to a noise component of the audio signal.

Aspect 7. The apparatus of any of Aspects 1 to 6, wherein the ML filter estimator includes one or more trained ML models.

Aspect 8. The apparatus of any of Aspects 1 to 7, wherein the ML filter estimator includes one or more trained neural networks.

Aspect 9. The apparatus of any of Aspects 1 to 8, wherein the voicing estimator includes one or more trained ML models.

Aspect 10. The apparatus of any of Aspects 1 to 9, wherein the voicing estimator includes one or more trained neural networks.

Aspect 11. The apparatus of any of Aspects 1 to 10, wherein, to generate the output audio signal, the one or more processors are configured to combine the plurality of band-specific signals using a synthesis filterbank.

Aspect 12. The apparatus of any of Aspects 1 to 11, wherein, to generate the output audio signal, the one or more processors are configured to modify the plurality of band-specific signals by applying at least one of the one or more linear filters to each of the plurality of band-specific signals according to the one or more parameters.

Aspect 13. The apparatus of Aspect 12, wherein, to generate the output audio signal, the one or more processors are configured to: combine the plurality of band-specific signals into a filtered signal; use a second filterbank to generate a second plurality of band-specific signals from the filtered signal, wherein the second plurality of band-specific signals correspond to a second plurality of frequency bands; modify the second plurality of band-specific signals by applying at least one of the one or more gain amplifiers to each of the second plurality of band-specific signals according to the one or more gain values; and combine the second plurality of band-specific signals.

Aspect 14. The apparatus of any of Aspects 12 or 13, wherein, to generate the output audio signal, the one or more processors are configured to: combine the plurality of band-specific signals into a filtered signal; and modify the filtered signal by applying the one or more gain amplifiers to the filtered signal according to the one or more gain values.

Aspect 15. The apparatus of any of Aspects 1 to 14, wherein, to generate the output audio signal, the one or more processors are configured to modify the plurality of band-specific signals by applying at least one of the one or more gain amplifiers to each of the plurality of band-specific signals according to the one or more gain values.

Aspect 16. The apparatus of Aspect 15, wherein, to generate the output audio signal, the one or more processors are configured to: combine the plurality of band-specific signals into an amplified signal; use a second filterbank to generate a second plurality of band-specific signals from the amplified signal, wherein the second plurality of band-specific signals correspond to a second plurality of frequency bands; modify the second plurality of band-specific signals by applying at least one of the one or more gain amplifiers to each of the second plurality of band-specific signals according to the one or more gain values; and combine the second plurality of band-specific signals.

Aspect 17. The apparatus of any of Aspects 15 or 16, wherein, to generate the output audio signal, the one or more processors are configured to: combine the plurality of band-specific signals into an amplified signal; and modify the amplified signal by applying the one or more gain amplifiers to the amplified signal according to the one or more gain values.

Aspect 18. The apparatus of any of Aspects 1 to 17, wherein the one or more linear filters include one or more time-varying linear filters.

Aspect 19. The apparatus of any of Aspects 1 to 18, wherein the one or more linear filters include one or more time-invariant linear filters.

Aspect 20. The apparatus of any of Aspects 1 to 19, wherein the one or more processors are configured to: modify the output audio signal using an additional linear filter.

Aspect 21. The apparatus of Aspect 20, wherein the additional linear filter is time-varying.

Aspect 22. The apparatus of any of Aspects 20 or 21, wherein the additional linear filter is time-invariant.

Aspect 23. The apparatus of any of Aspects 20 to 22, wherein the additional linear filter is a linear predictive coding (LPC) filter.

Aspect 24. The apparatus of any of Aspects 1 to 23, wherein the one or more processors are configured to: modify the excitation signal using an additional linear filter before using the filterbank to generate the plurality of band-specific signals from the excitation signal.

Aspect 25. The apparatus of Aspect 24, wherein the additional linear filter is time-varying.

Aspect 26. The apparatus of any of Aspects 24 or 25, wherein the additional linear filter is time-invariant.

Aspect 27. The apparatus of any of Aspects 24 to 26, wherein the additional linear filter is a linear predictive coding (LPC) filter.

Aspect 28. The apparatus of any of Aspects 1 to 27, wherein the one or more features include one or more log-mel-frequency spectrum features.

Aspect 29. The apparatus of any of Aspects 1 to 28, wherein the one or more parameters associated with one or more linear filters include an impulse response associated with the one or more linear filters.

Aspect 30. The apparatus of any of Aspects 1 to 29, wherein the one or more parameters associated with one or more linear filters include a frequency response associated with the one or more linear filters.

Aspect 31. The apparatus of any of Aspects 1 to 30, wherein the one or more parameters associated with one or more linear filters include a rational transfer function coefficient associated with the one or more linear filters.

Aspect 32. A method for audio coding, the method comprising: receiving one or more features corresponding an audio signal; generating an excitation signal based on the one or more features; using a filterbank to generate a plurality of band-specific signals from the excitation signal, wherein the plurality of band-specific signals correspond to a plurality of frequency bands; using a machine learning (ML) filter estimator to generate one or more parameters associated with one or more linear filters in response to input of the one or more features to the ML filter estimator; using a voicing estimator to generate one or more gain values associated with one or more gain amplifiers in response to input of the one or more features to the voicing estimator; and generating an output audio signal based on modification of the plurality of band-specific signals, application of the one or more linear filters according to the one or more parameters, and amplification using the one or more gain amplifiers according to the one or more gain values.

Aspect 33. The method of Aspect 32, wherein the audio signal is a speech signal, and wherein the output audio signal is a reconstructed speech signal that is a reconstructed variant of the speech signal.

Aspect 34. The method of any of Aspects 32 or 33, wherein receiving the one or more features includes receiving the one or more features from an encoder that generates the one or more features at least in part by encoding the audio signal.

Aspect 35. The method of any of Aspects 32 to 34, wherein receiving the one or more features includes receiving the one or more features from a speech synthesizer that generates the one or more features at least in part based on a text input, wherein the audio signal is an audio representation of a voice reading the text input.

Aspect 36. The method of any of Aspects 32 to 35, wherein the excitation signal is a harmonic excitation signal corresponding to a harmonic component of the audio signal.

Aspect 37. The method of any of Aspects 32 to 36, wherein the excitation signal is a noise excitation signal corresponding to a noise component of the audio signal.

Aspect 38. The method of any of Aspects 32 to 37, wherein the ML filter estimator includes one or more trained ML models.

Aspect 39. The method of any of Aspects 32 to 38, wherein the ML filter estimator includes one or more trained neural networks.

Aspect 40. The method of any of Aspects 32 to 39, wherein the voicing estimator includes one or more trained ML models.

Aspect 41. The method of any of Aspects 32 to 40, wherein the voicing estimator includes one or more trained neural networks.

Aspect 42. The method of any of Aspects 32 to 41, wherein generating the output audio signal includes combining the plurality of band-specific signals using a synthesis filterbank.

Aspect 43. The method of any of Aspects 32 to 42, wherein generating the output audio signal includes modifying the plurality of band-specific signals by applying at least one of the one or more linear filters to each of the plurality of band-specific signals according to the one or more parameters.

Aspect 44. The method of Aspect 43, wherein generating the output audio signal includes: combining the plurality of band-specific signals into a filtered signal; using a second filterbank to generate a second plurality of band-specific signals from the filtered signal, wherein the second plurality of band-specific signals correspond to a second plurality of frequency bands; modifying the second plurality of band-specific signals by applying at least one of the one or more gain amplifiers to each of the second plurality of band-specific signals according to the one or more gain values; and combining the second plurality of band-specific signals.

Aspect 45. The method of any of Aspects 43 or 44, wherein generating the output audio signal includes: combining the plurality of band-specific signals into a filtered signal; and modifying the filtered signal by applying the one or more gain amplifiers to the filtered signal according to the one or more gain values.

Aspect 46. The method of any of Aspects 32 to 45, wherein generating the output audio signal includes modifying the plurality of band-specific signals by applying at least one of the one or more gain amplifiers to each of the plurality of band-specific signals according to the one or more gain values.

Aspect 47. The method of Aspect 46, wherein generating the output audio signal includes: combining the plurality of band-specific signals into an amplified signal; using a second filterbank to generate a second plurality of band-specific signals from the amplified signal, wherein the second plurality of band-specific signals correspond to a second plurality of frequency bands; modifying the second plurality of band-specific signals by applying at least one of the one or more gain amplifiers to each of the second plurality of band-specific signals according to the one or more gain values; and combining the second plurality of band-specific signals.

Aspect 48. The method of any of Aspects 46 or 47, wherein generating the output audio signal includes: combining the plurality of band-specific signals into an amplified signal; and modifying the amplified signal by applying the one or more gain amplifiers to the amplified signal according to the one or more gain values.

Aspect 49. The method of any of Aspects 32 to 48, wherein the one or more linear filters include one or more time-varying linear filters.

Aspect 50. The method of any of Aspects 32 to 49, wherein the one or more linear filters include one or more time-invariant linear filters.

Aspect 51. The method of any of Aspects 32 to 50, further comprising: modifying the output audio signal using an additional linear filter.

Aspect 52. The method of Aspect 51, wherein the additional linear filter is time-varying.

Aspect 53. The method of any of Aspects 51 or 52, wherein the additional linear filter is time-invariant.

Aspect 54. The method of any of Aspects 51 to 53, wherein the additional linear filter is a linear predictive coding (LPC) filter.

Aspect 55. The method of any of Aspects 32 to 54, further comprising: modifying the excitation signal using an additional linear filter before using the filterbank to generate the plurality of band-specific signals from the excitation signal.

Aspect 56. The method of Aspect 55, wherein the additional linear filter is time-varying.

Aspect 57. The method of any of Aspects 55 or 56, wherein the additional linear filter is time-invariant.

Aspect 58. The method of any of Aspects 55 to 57, wherein the additional linear filter is a linear predictive coding (LPC) filter.

Aspect 59. The method of any of Aspects 32 to 58, wherein the one or more features include one or more log-mel-frequency spectrum features.

Aspect 60. The method of any of Aspects 32 to 59, wherein the one or more parameters associated with one or more linear filters include an impulse response associated with the one or more linear filters.

Aspect 61. The method of any of Aspects 32 to 60, wherein the one or more parameters associated with one or more linear filters include a frequency response associated with the one or more linear filters.

Aspect 62. The method of any of Aspects 32 to 61, wherein the one or more parameters associated with one or more linear filters include a rational transfer function coefficient associated with the one or more linear filters.

Aspect 63. A non-transitory computer-readable medium having stored thereon instructions that, when executed by one or more processors, cause the one or more processors to: receive one or more features corresponding an audio signal; generate an excitation signal based on the one or more features; use a filterbank to generate a plurality of band-specific signals from the excitation signal, wherein the plurality of band-specific signals correspond to a plurality of frequency bands; use a machine learning (ML) filter estimator to generate one or more parameters associated with one or more linear filters in response to input of the one or more features to the ML filter estimator; use a voicing estimator to generate one or more gain values associated with one or more gain amplifiers in response to input of the one or more features to the voicing estimator; and generate an output audio signal based on modification of the plurality of band-specific signals, application of the one or more linear filters according to the one or more parameters, and amplification using the one or more gain amplifiers according to the one or more gain values.

Aspect 64. The non-transitory computer-readable medium of Aspect 63, wherein execution of the instructions by the one or more processors cause the one or more processors to perform one or more operations according to at least one of any of Aspects 2 to 31 and/or Aspects 33 to 62.

Aspect 65. An apparatus for audio coding, the apparatus comprising: means for receiving one or more features corresponding an audio signal; means for generating an excitation signal based on the one or more features; means for using a filterbank to generate a plurality of band-specific signals from the excitation signal, wherein the plurality of band-specific signals correspond to a plurality of frequency bands; means for using a machine learning (MIL) filter estimator to generate one or more parameters associated with one or more linear filters in response to input of the one or more features to the MIL, filter estimator; means for using a voicing estimator to generate one or more gain values associated with one or more gain amplifiers in response to input of the one or more features to the voicing estimator; and means for generating an output audio signal based on modification of the plurality of band-specific signals, application of the one or more linear filters according to the one or more parameters, and amplification using the one or more gain amplifiers according to the one or more gain values.

Aspect 66. The apparatus of Aspect 65, further comprising: means for performing one or more operations according to at least one of any of Aspects 2 to 31 and/or Aspects 33 to 62.

What is claimed is:

1. An apparatus for audio coding, the apparatus comprising:
- a memory; and
- one or more processors coupled to the memory, the one or more processors configured to:
  - receive one or more features corresponding an audio signal;
  - generate an excitation signal based on the one or more features;
  - use a filterbank to generate a plurality of band-specific signals from the excitation signal, wherein the plurality of band-specific signals correspond to a plurality of frequency bands;
  - use a machine learning (ML) filter estimator to generate one or more parameters associated with one or more linear filters in response to input of the one or more features to the ML filter estimator;
  - use a voicing estimator to generate one or more gain values associated with one or more gain amplifiers in response to input of the one or more features to the voicing estimator;
  - combine the plurality of band-specific signals into a combined signal;
  - use a second filterbank to generate a second plurality of band-specific signals from the combined signal, wherein the second plurality of band-specific signals correspond to a second plurality of frequency bands;
  - modify the second plurality of band-specific signals based on application of at least one of the one or more gain amplifiers to each of the second plurality of band-specific signals according to the one or more gain values; and
  - combine the second plurality of band-specific signals to generate an output audio signal.

2. The apparatus of claim 1, wherein the audio signal is a speech signal, and wherein the output audio signal is a reconstructed speech signal that is a reconstructed variant of the speech signal.

3. The apparatus of claim 1, wherein, to receive the one or more features, the one or more processors are configured to receive the one or more features from at least one of:
- an encoder configured to generate the one or more features at least in part by encoding the audio signal; or
- a speech synthesizer configured to generate the one or more features at least in part based on a text input, wherein the audio signal is an audio representation of a voice reading the text input.

4. The apparatus of claim 1, wherein the excitation signal is one of:
- a harmonic excitation signal corresponding to a harmonic component of the audio signal; or
- a noise excitation signal corresponding to a noise component of the audio signal.

5. The apparatus of claim 1, wherein the ML filter estimator includes one of:
- one or more trained ML models; or
- one or more trained neural networks.

6. The apparatus of claim 1, wherein the voicing estimator includes one of:
- one or more trained ML models; or
- one or more trained neural networks.

7. The apparatus of claim 1, wherein, to generate the output audio signal, the one or more processors are configured to combine the plurality of band-specific signals using a synthesis filterbank.

8. The apparatus of claim 1, wherein, to generate the output audio signal, the one or more processors are configured to modify the plurality of band-specific signals by applying at least one of the one or more linear filters to each of the plurality of band-specific signals according to the one or more parameters.

9. The apparatus of claim 8, wherein the combined signal comprises a filtered signal.

10. The apparatus of claim 1, wherein, to generate the output audio signal, the one or more processors are configured to modify the plurality of band-specific signals by applying at least one of the one or more gain amplifiers to each of the plurality of band-specific signals according to the one or more gain values.

11. The apparatus of claim 10, wherein the combined signal comprises an amplified signal.

12. The apparatus of claim 1, wherein the one or more processors are configured to:

modify the output audio signal using a first additional linear filter.

13. The apparatus of claim 1, wherein the one or more processors are configured to:

modify the excitation signal using a second additional linear filter before using the filterbank to generate the plurality of band-specific signals from the excitation signal.

14. The apparatus of claim 1, wherein the one or more features include one or more log-mel-frequency spectrum features.

15. The apparatus of claim 1, wherein the one or more parameters associated with one or more linear filters include at least one of:

an impulse response associated with the one or more linear filters;

a frequency response associated with the one or more linear filters; or a rational transfer function coefficient associated with the one or more linear filters.

16. A method for audio coding, the method comprising:

receiving one or more features corresponding an audio signal;

generating an excitation signal based on the one or more features;

using a filterbank to generate a plurality of band-specific signals from the excitation signal, wherein the plurality of band-specific signals correspond to a plurality of frequency bands;

using a machine learning (ML) filter estimator to generate one or more parameters associated with one or more linear filters in response to input of the one or more features to the ML filter estimator;

using a voicing estimator to generate one or more gain values associated with one or more gain amplifiers in response to input of the one or more features to the voicing estimator;

combining the plurality of band-specific signals into a combined signal;

using a second filterbank to generate a second plurality of band-specific signals from the combined signal, wherein the second plurality of band-specific signals correspond to a second plurality of frequency bands;

modifying the second plurality of band-specific signals by applying at least one of the one or more gain amplifiers to each of the second plurality of band-specific signals according to the one or more gain values; and combining the second plurality of band-specific signals to generate an output audio signal.

17. The method of claim 16, wherein the audio signal is a speech signal, and wherein the output audio signal is a reconstructed speech signal that is a reconstructed variant of the speech signal.

18. The method of claim 16, wherein receiving the one or more features includes receiving the one or more features from at least one of:

an encoder that generates the one or more features at least in part by encoding the audio signal; or a speech synthesizer that generates the one or more features at least in part based on a text input, wherein the audio signal is an audio representation of a voice reading the text input.

19. The method of claim 16, wherein the excitation signal is one of:

a harmonic excitation signal corresponding to a harmonic component of the audio signal; or a noise excitation signal corresponding to a noise component of the audio signal.

20. The method of claim 16, wherein the ML filter estimator includes one of:

one or more trained ML models; or one or more trained neural networks.

21. The method of claim 16, wherein the voicing estimator includes one of:

one or more trained ML models; or one or more trained neural networks.

22. The method of claim 16, wherein generating the output audio signal includes combining the plurality of band-specific signals using a synthesis filterbank.

23. The method of claim 16, wherein generating the output audio signal includes modifying the plurality of band-specific signals by applying at least one of the one or more linear filters to each of the plurality of band-specific signals according to the one or more parameters.

24. The method of claim 23, wherein the combined signal comprises a filtered signal.

25. The method of claim 16, wherein generating the output audio signal includes modifying the plurality of band-specific signals by applying at least one of the one or more gain amplifiers to each of the plurality of band-specific signals according to the one or more gain values.

26. The method of claim 25, Wherein the combined signal comprises an amplified signal.

27. The method of claim 16, further comprising:

modifying the output audio signal using a first additional linear filter.

28. The method of claim 16, further comprising:

modifying the excitation signal using an additional linear filter before using the filterbank to generate the plurality of band-specific signals from the excitation signal.

29. The method of claim 16, wherein the one or more features include one or more log-mel-frequency spectrum features.

30. A non-transitory computer-readable medium having stored thereon instructions that, when executed by one or more processors, cause the one or more processors to:

receive one or more features corresponding an audio signal;

generate an excitation signal based on the one or more features;

use a filterbank to generate a plurality of band-specific signals from the excitation signal, wherein the plurality of band-specific signals correspond to a plurality of frequency bands;

use a machine learning (ML) filter estimator to generate one or more parameters associated with one or more linear filters in response to input of the one or more features to the ML filter estimator;

use a voicing estimator to generate one or more gain values associated with one or more gain amplifiers in response to input of the one or more features to the voicing estimator;

combine the plurality of band-specific signals into a combined signal;

use a second filterbank to generate a second plurality of band-specific signals from the combined signal, wherein the second plurality of band-specific signals correspond to a second plurality of frequency bands;

modify the second plurality of band-specific signals based on application of at least one of the one or more gain amplifiers to each of the second plurality of band-specific signals according to the one or more gain values; and combine the second plurality of band-specific signals to generate an output audio signal.

* * * * *